US011829842B2

(12) United States Patent
Javadiabhari et al.

(10) Patent No.: US 11,829,842 B2
(45) Date of Patent: Nov. 28, 2023

(54) ENHANCED QUANTUM CIRCUIT EXECUTION IN A QUANTUM SERVICE

(71) Applicant: International Business Machines Corporation, Armonk, NY (US)

(72) Inventors: Ali Javadiabhari, Sleepy Hollow, NY (US); Dmitri Maslov, New Canaan, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 17/065,291

(22) Filed: Oct. 7, 2020

(65) Prior Publication Data

US 2022/0108201 A1    Apr. 7, 2022

(51) Int. Cl.
*G06N 10/00* (2022.01)
*G06F 16/22* (2019.01)

(52) U.S. Cl.
CPC ............. *G06N 10/00* (2019.01); *G06F 16/22* (2019.01)

(58) Field of Classification Search
CPC .... G06F 16/24522; G06F 16/22; G06N 10/00
USPC ........................................................ 707/812
See application file for complete search history.

(56) References Cited

U.S. PATENT DOCUMENTS

| 6,456,994 | B1 | 9/2002 | Tucci | |
|---|---|---|---|---|
| 7,133,888 | B2 | 11/2006 | Kohn et al. | |
| 7,467,131 | B1 | 12/2008 | Gharachorloo et al. | |
| 10,282,674 | B2 | 5/2019 | Adachi et al. | |
| 2003/0169041 | A1 | 9/2003 | Coury et al. | |
| 2007/0162262 | A1* | 7/2007 | Tucci | G06N 10/00 703/1 |
| 2013/0100477 | A1* | 4/2013 | Ozaki | G06F 3/1288 358/1.13 |
| 2014/0280427 | A1* | 9/2014 | Bocharov | B82Y 10/00 708/200 |
| 2018/0137155 | A1 | 5/2018 | Majumdar et al. | |

(Continued)

FOREIGN PATENT DOCUMENTS

| CN | 110187885 | | 8/2019 | |
|---|---|---|---|---|
| EP | 3836038 | A1 * | 6/2021 | ............. G06F 9/223 |
| WO | 202056176 | | 3/2020 | |

*Primary Examiner* — Giovanna B Colan
(74) *Attorney, Agent, or Firm* — Amin, Turocy & Watson, LLP

(57) ABSTRACT

Techniques for enhancing quantum circuit execution in a quantum service are presented. Database component stores compiled unitaries associated with quantum functions. Unitary management component (UMC) determines whether to compile a unitary associated with a quantum function for storage in the database component based on a composite quality score associated with the unitary and a threshold composite quality score associated with the quantum function, wherein the threshold score can be, or can be based on, a composite quality score of a compiled unitary that performs the same quantum function or a compiled unitary that performs a different quantum function. UMC determines the composite quality score based on a group of factors comprising frequency of utilizing the quantum function or equivalent quantum function or computation, age of the quantum function or computation, difficulty level of compiling a unitary, quantum circuit quality, or error associated with experimental execution of the quantum function.

20 Claims, 10 Drawing Sheets

(56) References Cited

U.S. PATENT DOCUMENTS

| | | |
|---|---|---|
| 2018/0349282 A1 | 12/2018 | Brahm et al. |
| 2018/0365585 A1 | 12/2018 | Smith et al. |
| 2019/0042971 A1* | 2/2019 | Zou ........................ G06F 9/382 |
| 2019/0049495 A1* | 2/2019 | Ofek ..................... G06F 9/5027 |
| 2020/0057764 A1* | 2/2020 | Chin ................. G06F 16/24522 |
| 2020/0167278 A1 | 5/2020 | Gunnels et al. |
| 2020/0192993 A1 | 6/2020 | Greenberg et al. |
| 2021/0286601 A1* | 9/2021 | Fitzsimons ............. G06F 8/447 |
| 2022/0092454 A1* | 3/2022 | Kliuchnikov .......... G06N 10/00 |
| 2022/0108201 A1* | 4/2022 | Javadiabhari .......... G06N 10/80 |

\* cited by examiner

ENHANCED QUANTUM CIRCUIT EXECUTION IN A QUANTUM SERVICE

BACKGROUND

The subject disclosure relates to quantum circuitry, and more specifically, to enhanced quantum circuit execution in a quantum service.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, methods, apparatuses, and/or computer program products that can facilitate creating, designing, and/or utilizing a current biased tunable qubit are presented.

According to an embodiment, a system can comprise a memory that stores computer-executable components, and a processor, operatively coupled to the memory, that executes computer-executable components. The system also can comprise a unitary management component that determines whether to compile a unitary associated with a quantum function for storage in a database component based on a composite quality score associated with the unitary and a defined threshold composite quality score associated with the quantum function.

Another embodiment relates to a computer-implemented method that can comprise determining, by a system operatively coupled to a processor, whether to compile a unitary associated with a quantum function for storage in a database component based on a composite quality score associated with the unitary and a defined threshold composite quality score associated with the quantum function.

A further embodiment relates to a computer program product that facilitates managing unitaries. The computer program product can comprise a computer readable storage medium having program instructions embodied therewith, where the program instructions are executable by a processor to cause the processor to: determine whether to compile a unitary associated with a quantum function for storage in a database component based on a composite quality score associated with the unitary and a defined threshold composite quality score associated with the quantum function.

These and other features will become apparent from the following detailed description of illustrative embodiments thereof, which is to be read in connection with the accompanying drawings.

DETAILED DESCRIPTION

Figure 1:
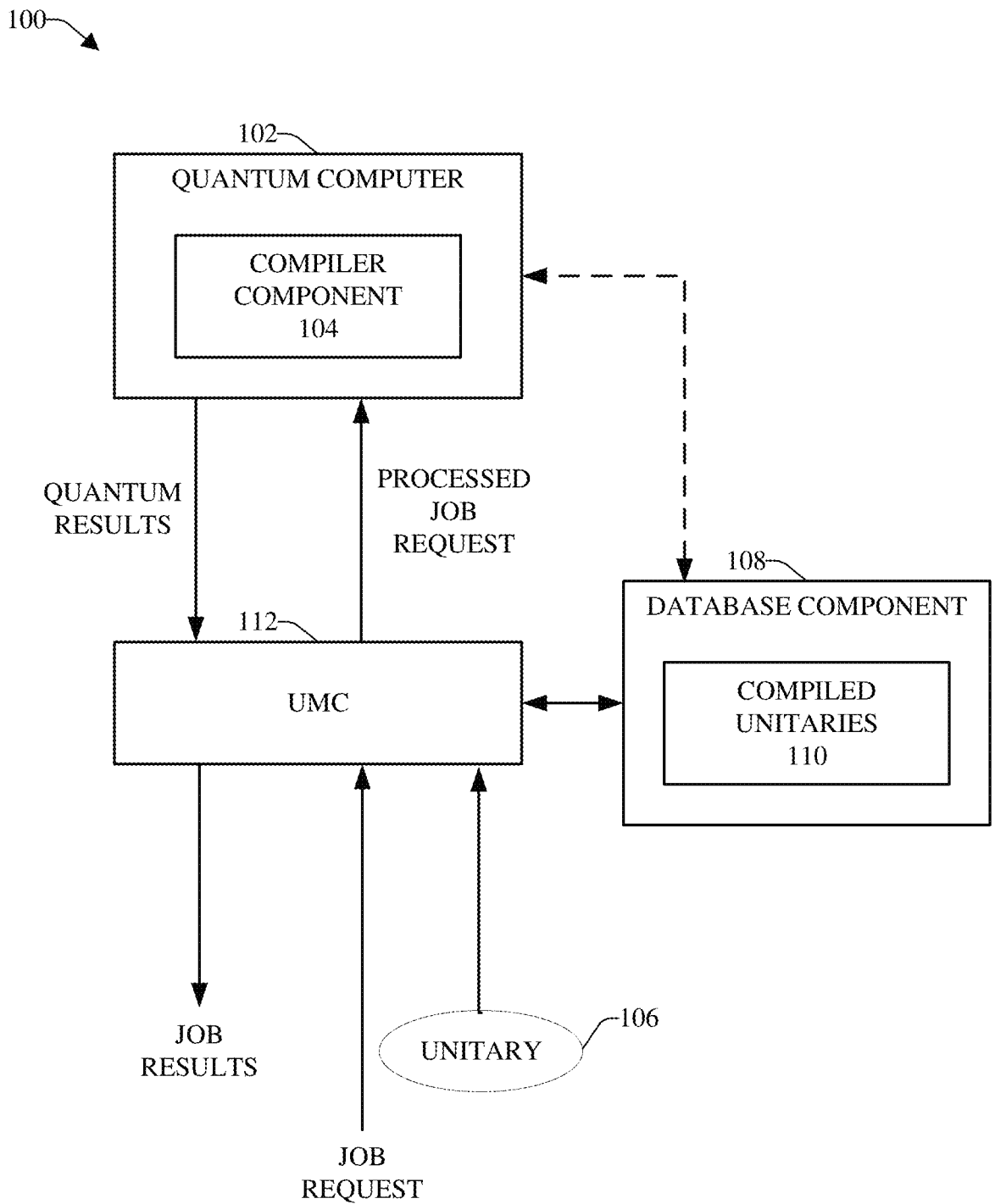
FIG. 1 illustrates a block diagram of an example, non-limiting system that can manage a database of compiled unitaries, and determine whether to compile a unitary and store it in the database, to facilitate enhancing quantum circuit execution in a quantum service, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals can be used to refer to like elements throughout. In the following description, for purposes of explanation, numerous specific details are set forth in order to provide a more thorough understanding of the one or more embodiments. It is evident, however, in various cases, the one or more embodiments can be practiced without these specific details.

Quantum computing cloud service providers can execute millions of jobs for users during a year. This can create pressure to execute the quantum programs quickly, for example, to maximize system usage, minimize compiling time to compile quantum programs, which can result in users having to wait for the compiling to be completed, and can undesirably consume classical computational resources. This also can create pressure to execute these jobs well, so that the most performance can be extracted from near-term error-prone systems, and can improve the quality of compiling into physical-level pulses.

It can be desirable to improve the execution time for executing these jobs and improve the quality of executing these jobs as well. The disclosed subject matter can employ various techniques that can improve (e.g., enhance, optimize, and/or reduce) the execution time for executing quantum program jobs and improve (e.g., enhance, optimize, and/or increase) the quality of execution of such jobs.

To that end, the various embodiments described herein relate to techniques for enhancing quantum circuit execution in a quantum service are presented. A database component can store compiled unitaries associated with quantum functions (e.g., quantum functions that can be performed by quantum circuits, quantum computations, and/or quantum programs). A unitary management component (UMC) can determine whether to compile a unitary associated with a quantum function for storage in the database component based at least in part on a composite quality score associated with the unitary and a defined threshold composite quality score associated with (e.g., applicable to) the quantum function. The defined threshold composite quality score can be, or can be based at least in part on, a composite quality score of a first compiled unitary that can perform the same or equivalent quantum function as the quantum function of the unitary under consideration, or a second compiled unitary that can perform a different quantum function, wherein the first compiled unitary and the second compiled unitaries can be compiled unitaries that are stored in the database component. The UMC can determine (e.g., calculate) a composite quality score for a unitary based at least in part on a group of factors comprising a frequency of usage of a quantum computation or equivalent quantum computation associated with a unitary, an age of the quantum computation associated with a unitary (e.g., a length of time since a last query for the quantum computation or equivalent quantum computation), a level of difficulty in compiling a unitary, a quality of the quantum circuit associated with a unitary, and/or a quality of experiment associated with a unitary, as more fully described herein.

The UMC can be utilized to desirably (e.g., quickly, efficiently, and/or optimally) extract a desirable (e.g., efficient and/or optimal) compiled quantum circuit, as more fully described herein. The UMC can update the database component of compiled unitaries offline (e.g., by elaborate optimization of high-scoring unitaries) and online (e.g., when a user introduces a new unitary, this can change, or at least potentially can change, the quality or merit scores of unitaries), as more fully described herein. The more the database component is used, the higher the probability that a desirably (e.g., efficiently and/or optimally) compiled quantum circuit can be readily found by the UMC for use in a job.

These and other aspects and embodiments of the disclosed subject matter will now be described with respect to the drawings.

FIG. 1 illustrates a block diagram of an example, non-limiting system 100 that can manage a database of compiled unitaries, and determine whether to compile a unitary and store it in the database, to facilitate enhancing quantum circuit execution in a quantum service, in accordance with various aspects and embodiments of the disclosed subject matter. In some embodiments, the system 100 can comprise a quantum computer 102 (e.g., quantum computer system) that can employ quantum algorithms and quantum circuitry, including computing components and devices, to perform quantum operations and functions on input data to produce results that can be output to a user. The quantum circuitry can comprise quantum bits (qubits), such as multi-bit qubits, physical circuit level components, high level components or functions, and/or physical pulses that can be structured (e.g., arranged or designed) to perform desired quantum functions or computations on data (e.g., input data and/or intermediate data derived from input data) to produce results as an output, wherein the results can be responsive to the job request and associated input data, and can be based at least in part on the input data and quantum functions or computations.

The quantum computer 102 can comprise or be associated with (e.g., communicatively connected to) a compiler component 104 (e.g., quantum compiler component) that can compile unitaries, which can comprise quantum programs, quantum algorithms, and/or other quantum information, to generate compiled unitaries that can perform respective quantum functions or computations. The compiler component 104 can translate or convert a unitary, such as unitary 106 (if unitary 106 is to be compiled), into native gates that can be implemented or executed by quantum hardware of the quantum computer 102. The compiler component 104 can facilitate mapping and/or scheduling quantum program information relating to quantum circuitry to quantum hardware components (e.g., hardware qubits, schedule gates, . . . ) while satisfying applicable constraints (e.g., quantum hardware constraints) and enhancing (e.g., improving or optimizing) execution of the quantum program (e.g., enhancing execution time of executing the quantum program).

The system 100 also can include a database component 108 that can store compiled unitaries 110 and information (e.g., metadata) relating thereto. The compiled unitaries 110 can perform respective quantum functions or computations. In some embodiments, the compiled unitaries 110 stored in the database component 108 can be unitaries that have been determined to be desirable (e.g., suitable or optimal) for storage in the database component 108, based on a number of factors, in order to enhance quantum circuit execution by a quantum service that employs the quantum computer 102 and database component 108 to facilitate providing desirably performed (e.g., suitably or optimally executed or performed) quantum computing on, and responsive to, job requests, as more fully described herein. In accordance with various embodiments, the quantum service can be a quantum service that can reside in the cloud (e.g., can reside in a cloud computing environment), wherein all or a portion of the components of the system 100 can reside in the cloud, or can reside locally in a local computing environments (e.g., at a desired location(s)).

To facilitate desirably enhancing quantum circuit execution, in accordance with various embodiments, the system 100 can comprise a unitary management component 112 (UMC) that can manage the storing of compiled unitaries 110, and information (e.g., metadata) relating thereto, in the database component 108, wherein respective compiled unitaries 110 can be associated with (e.g., can be used to perform or facilitate performing) respective quantum functions or computations. The UMC 112 also can evaluate unitaries, such as unitary 106, and can determine whether a particular uncompiled unitary (e.g., unitary 106) associated with a job request is to be compiled and utilized by the quantum computer 102 during a job and is to be stored as a compiled unitary in the database component 108, or whether a compiled unitary 110 stored in the database component 108 is to be utilized for the job in place of the uncompiled unitary associated with the job request, in accordance with defined unitary management criteria, as more fully described herein.

For example, with regard to a job request where a unitary 106 associated with a quantum function and/or computation is received in connection with the request, the UMC 112 can search or facilitate searching the database component 108 to determine whether there is a compiled unitary 110 associated with the same quantum function and/or computation (e.g., a compiled unitary 110 that matches or substantially matches the unitary 106), can evaluate or determine the respective qualities of the respective unitaries 106 and 110 (e.g., using respective composite quality scores of the respective unitaries), and can select the unitary that is determined to have the higher quality, in accordance with the defined unitary management criteria, as more fully described herein. For instance, if the UMC 112 determines that the uncompiled unitary 106 is of higher quality than the compiled unitary 110, and compiling and using the unitary 106 can provide a better result during execution of the job, the UMC 112 can determine that the unitary 106 is to be compiled and used in execution of the job, and stored in the database component 108. This can result in improvement in the quality of the database component 108 (e.g., improvement in the quality of the compiled unitaries 110 stored in the database component 108). Conversely, if the UMC 112 determines that the compiled unitary 110 is of higher quality than the uncompiled unitary 106, the UMC 112 can determine that the compiled unitary 110 is to be used in place of the uncompiled unitary 106 during execution of the job, and can save the time and resources of the system 100, and can improve performance by the system 100, by not compiling the uncompiled unitary 106 that the UMC 112 has already determined is of lower quality than the already compiled unitary 110 stored in the database component 108.

Unitaries, such as unitary 106, in uncompiled form, or the compiled unitaries 110 can perform respective quantum functions or computations. Each unitary (e.g., unitary 106 or compiled unitary 110) can have a matrix (e.g., a quantum or unitary matrix) that can represent the quantum function or computations that can be performed by the unitary.

In some embodiments, a first unitary (e.g., a first unitary 106 or first compiled unitary 110) associated with a quantum function can comprise first quantum circuitry that can perform or facilitate performing the quantum function, wherein the first quantum circuitry can be associated with (e.g., can have) a first circuit graph that can represent the first quantum circuitry. A second unitary (e.g., a second unitary 106 or second compiled unitary 110) associated with the quantum function can comprise second quantum circuitry that can perform or facilitate performing the quantum function (e.g., can perform the same quantum function as the first unitary and associated first quantum circuitry), wherein the second quantum circuitry can be associated with (e.g., can have) a second circuit graph that can represent the second quantum circuitry. Thus, even though the first unitary and the second unitary can perform the same quantum function, the first unitary and second unitary can utilize different quantum circuitry that each can perform the same quantum function. In such instances, the second unitary can be considered, and determined to be, equivalent, or at least substantially or sufficiently equivalent, to the first unitary. However, while the first unitary and the second unitary can be considered equivalent to each other, in that they each can be utilized to perform the same quantum function, the first unitary can be of higher quality (e.g., can be more efficient, can be faster, can utilize less resources, or can otherwise perform better) than the second unitary (or vice versa). For instance, the first quantum circuitry of the first unitary can be of higher quality than the second quantum circuitry of the second unitary. Accordingly, the UMC 112 can score and rank (e.g., through a quality or merit score, or composite quality or merit score) the first unitary higher than the second unitary, and can manage the unitaries, including the first unitary and second unitary, with regard to the database component 108 (e.g., with regard to whether to store a unitary in the database component 108 or whether to use a stored compiled unitary 110 from the database component 108 during execution of a job, instead of using a submitted unitary) and with regard to selection of unitaries for execution by the quantum computer 102 during running of a job, as more fully described herein.

Figure 2:
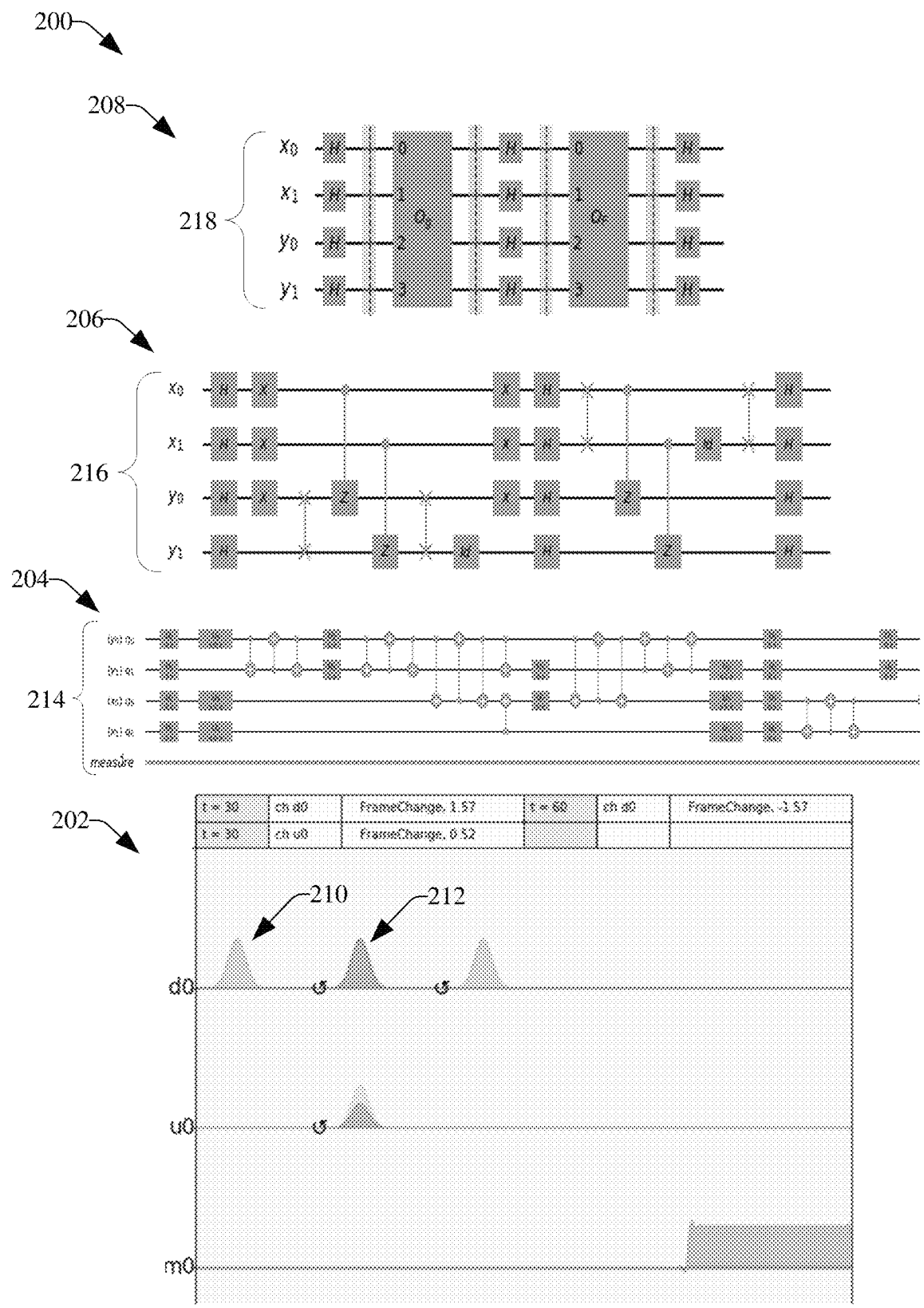
FIG. 2 depicts a diagram of an example abstraction layers of quantum programs that can be utilized by users, in accordance with various aspects and embodiments of the disclosed subject matter.

A quantum program associated with a unitary (e.g., unitary 106 or compiled unitary 110) can be or can comprise one or more physical pulses (e.g., a sequence of physical pulses), a physical (e.g., hardware) circuit, a quantum circuit, and/or a higher abstracted level of functionality. In that regard, referring briefly to FIG. 2 (along with FIG. 1), FIG. 2 depicts a diagram of an example abstraction layers 200 of quantum programs that can be utilized by users, in accordance with various aspects and embodiments of the disclosed subject matter. The abstraction layers 200 can comprise a physical pulse level 202, a physical circuit level 204, a quantum circuit level 206, and a high quantum computation level 208. The physical pulse level 202 (e.g., physical pulse layer) can relate to physical pulses, such as a sequence of physical pulses, that can be applied to quantum components, such as qubits, to facilitate controlling operation of the quantum components (e.g., to control a qubit to place the qubit in desired states at desired times). A pulse generator component (not shown in FIG. 1 or 2) of the quantum computer 102 can generate and provide the physical pulses (e.g., pulse 210, pulse 212, . . . ) to the quantum components.

The physical circuit level 204 (e.g., physical circuit layer) can relate to the physical (e.g., hardware) components of the physical circuit that can be mapped and translated to native gates (e.g., native quantum gates). A physical circuit can correspond to, and can be mapped and translated to, a set or sequence of native gates. An example physical circuit diagram 214 is presented for illustrative purposes in FIG. 2, and the layout of a physical circuit can vary based at least in part on the unitary (e.g., unitary 106 (if compiled) or compiled unitary 110) and the quantum function to be performed using the unitary.

The quantum circuit level 206 (e.g., quantum circuit layer) can comprise quantum components that can form a desired quantum circuit that can perform a desired quantum function or computation. The quantum circuit level 206 can include the use of multi-qubit gates, wherein, for example, if and as desired, the multi-qubit gates can be broken down to two-qubit gates or single-qubit gate, as desired. An example quantum circuit diagram 216 is presented for illustrative purposes in FIG. 2, and the layout of a quantum circuit can vary based at least in part on the unitary (e.g., unitary 106 (if compiled) or compiled unitary 110) and the quantum function to be performed using the unitary.

The high quantum computation level 208 (e.g., high layer) can be a higher abstraction layer that can relate to higher-level quantum functions that can be performed using a unitary (e.g., unitary 106 (if compiled) or compiled unitary 110). The higher-level quantum functions can comprise, for example, quantum Fourier transform (QFT), oracles (e.g., quantum oracles), arithmetic functions, and/or other desired higher-level quantum functions. An example higher-level quantum computation diagram 218 is presented for illustrative purposes in FIG. 2, and the layout of a higher-level quantum computation can vary based at least in part on the unitary (e.g., unitary 106 (if compiled) or compiled unitary 110) and the quantum function to be performed using the unitary.

The system 100, employing the UMC 112 and the database component 108 comprising the compiled unitaries 110, can enhance (e.g., improve or optimize) quantum programs at these various abstraction layers (e.g., at the physical pulse level 202, physical circuit level 204, quantum circuit level 206, and high quantum computation level 208) to facilitate desirable (e.g., enhanced or optimized) quantum circuit execution. For instance, the disclosed subject matter, by employing the UMC 112 and database component 108 comprising compiled unitaries 110, can create a vast improvement in speed of execution of jobs by the quantum computer 102 for complex and/or difficult to compile computations by drawing from a history of pre-compiled computations (e.g., compiled unitaries 108 associated with such quantum functions and computations) as well as by compiling-in-anticipation due, for example, to a high demand for a particular job or experiment, as more fully described herein. For example, in the case of pulses (e.g., pulse 210, pulse 212, . . . , at the physical pulse level 202), compiling pulses (e.g., by the compiler component 104) via techniques such as optimal control often can scale poorly. However, the disclosed subject matter, employing the UMC 112, can manage unitaries (e.g., unitary 106, compiled unitaries 110) and the database component 108 such that the time associated with compiling pulses can be invested by the system 100 ahead of time and the compiled unitaries 110 in the database component 108 can be used for future executions of jobs by the quantum computer 102, instead of compiling the unitaries at runtime of the job. The disclosed subject matter (e.g., system 100) can provide similar enhancements with regard to physical circuits, quantum circuits, and higher-level quantum computations. Also, given that the state of the system can fluctuate, the scoring mechanism of the disclosed subject matter, as performed by the UMC 112 and described herein, over a large number of datapoints, can smooth over the data fluctuations and, over time, can gain significant improvement as more data is evaluated by the UMC 112. The disclosed subject matter also can improve execution quality of the execution of jobs by the system 100 by drawing on circuit or pulse equivalencies that may not be discoverable by automation, yet can be discovered by the UMC 112 comparing many job executions, as more fully described herein.

With further regard to evaluating unitaries (e.g., unitary 106), when a job request for a job to be performed by the quantum computer 102 is received from a requestor (e.g., a user or other entity, or a device), one or more unitaries, such as unitary 106, can be received from the requestor, from an entity associated with the quantum service, or from a unitary generator component (not shown in FIG. 1) that can automatically generate the unitary(ies) (e.g., unitary 106), in connection with the job request. The one or more unitaries (e.g., unitary 106) can be relevant to the job that is to be performed by the quantum computer 102 in response to the request. With regard to a unitary 106, the UMC 112 can analyze the unitary 106, and, based at least in part on the results of such analysis, the UMC 112 can determine the quantum function or computation associated with the unitary 106.

The UMC 112 also can determine (e.g., calculate) a composite quality score associated with the unitary 106 and associated quantum function based at least in part on a group (e.g., set) of factors. The group of factors (e.g., characteristics or attributes) can include, for example, a frequency of usage of a quantum function or computation, or an equivalent quantum function or computation, associated with the unitary, an age of the quantum function or computation associated with the unitary (e.g., the length of time since a last query for or use of the quantum function or computation, or equivalent quantum function or computation), a level of difficulty in compiling the unitary, a quality of the quantum circuit associated with the unitary, and/or a quality of experiment associated with the unitary, in accordance with the defined unitary management component, as more fully described herein.

The UMC 112 can analyze (e.g., evaluate or compare) the composite quality score of the unitary 106 in relation to a defined threshold composite quality score associated with (e.g., applicable to) the unitary 106 (e.g., applicable to the quantum function associated with the unitary 106), or associated with the database component 108 in general, wherein the defined threshold composite quality score can be determined as more fully described herein. Based at least in part on the result of analyzing the composite quality score of the unitary 106 in relation to the defined threshold composite quality score, the UMC 112 can determine whether the unitary 106 is to be compiled and stored, as a compiled unitary, in the database component 108, and utilized for the job, or whether the unitary 106 is to be discarded and a compiled unitary 110 associated with the quantum function is to be retrieved from the database component 108 and used for the job in place of the unitary 106. For example, if the UMC 112 determines that the composite quality score of the unitary 106 satisfies (e.g., exceeds or is greater than) the defined threshold composite quality score, the UMC 112 can determine that the unitary 106 is to be compiled and stored in the database component 108, and is to be used for the job. If the UMC 112 determines that the unitary 106 is to be compiled and stored in the database component 108, the UMC 112 also can determine whether a compiled unitary 110 stored in the database component 108 is to be removed (e.g., deleted or discarded) from the database component 108.

If, instead, the UMC 112 determines that the composite quality score of the unitary 108 does not satisfy (e.g., is less than) the defined threshold composite quality score, the UMC 112 can determine that the unitary 106 is not to be compiled and is not to be stored in the database component 108. In such case, the UMC 112 can discard the unitary 106, and can retrieve a compiled unitary 110 associated with the quantum function from the database component 108. The UMC 112 can use or facilitate using the retrieved compiled unitary 110 for the job in place of the discarded unitary 106.

With further regard to the defined threshold composite quality score, in some embodiments, the UMC 112 can determine the defined threshold composite quality score associated with the quantum function and unitary based at least in part on (e.g., as a function of) the composite quality score (e.g., a highest composite quality score) of a compiled unitary 110, associated with the same or equivalent quantum function, that is stored in the database component 108. For example, the UMC 112 can determine and set the defined threshold composite quality score to be the composite quality score of the compiled unitary 110 associated with the same or equivalent quantum function, or to be a small amount higher or lower than the composite quality score of the compiled unitary 110. In other embodiments, the UMC 112 can determine the defined threshold composite quality score based at least in part on the composite quality score (e.g., a lowest composite quality score) of a compiled unitary 110 that is stored in the database component 108, wherein such compiled unitary 110 can be associated with a same or different quantum function as the unitary 106 under consideration. For example, the UMC 112 can determine and set the defined threshold composite quality score to be the composite quality score of the compiled unitary with the lowest composite quality score of all of the compiled unitaries 110 stored in the database component 108, or to be a small amount higher or lower than such lowest composite quality score. In certain embodiments, the UMC 112 can apply multiple threshold composite quality scores when evaluating a unitary 106, including a first defined threshold composite quality score that can be determined based at least in part on the composite quality score (e.g., a highest composite quality score) of a compiled unitary 110 associated with the same or equivalent quantum function as the unitary 106, and a second defined threshold composite quality score that can be determined based at least in part on a lowest composite quality score of another compiled unitary 110 that is stored in the database component 108, wherein such other compiled unitary 110 can be associated with a different quantum function as the unitary 106.

Figure 3:
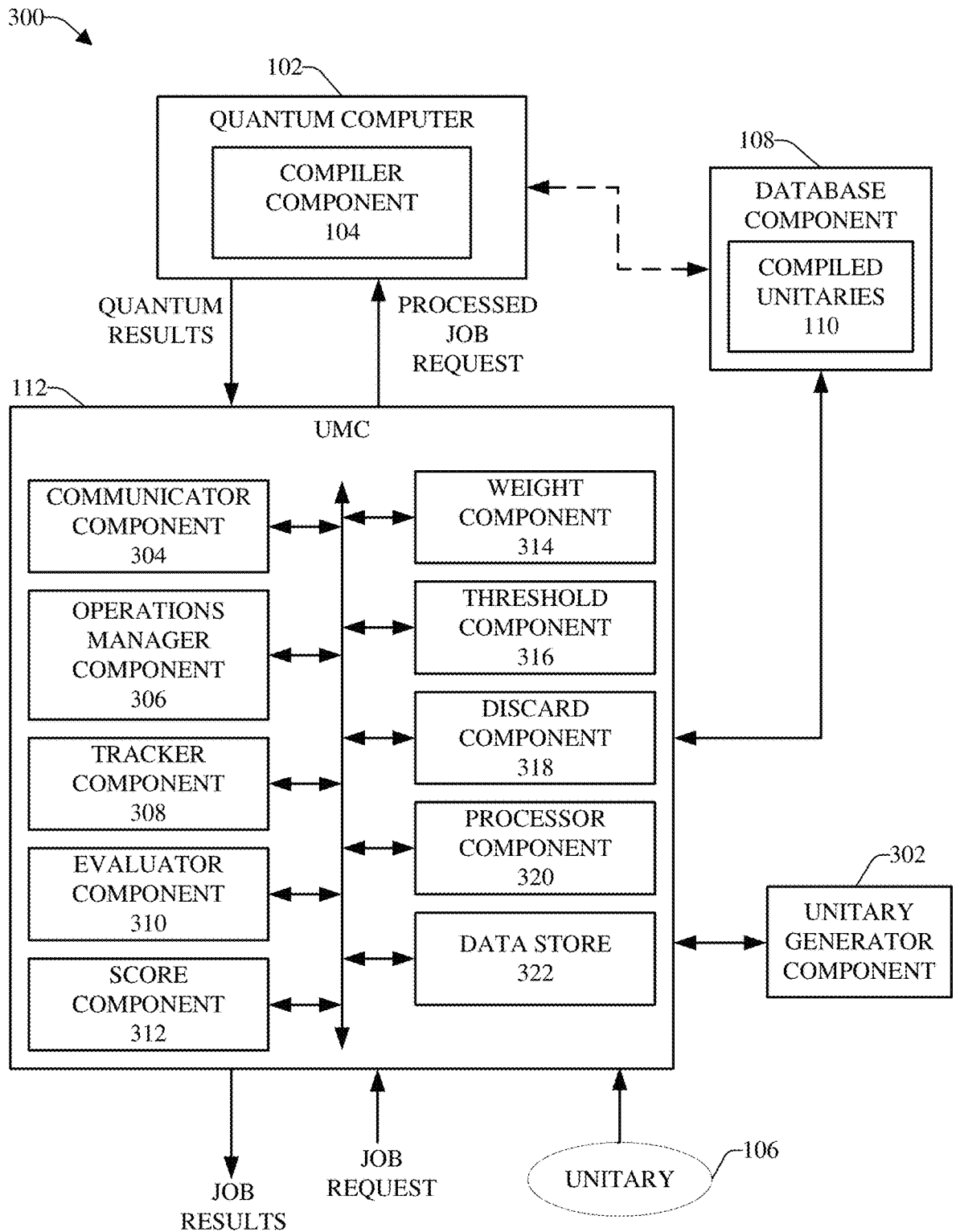
FIG. 3 illustrates a block diagram of another example, non-limiting system that can manage a database of compiled unitaries, and determine whether to compile a unitary and store it in the database, to facilitate enhancing quantum circuit execution in a quantum service, in accordance with various aspects and embodiments of the disclosed subject matter.

Referring to FIG. 3, FIG. 3 illustrates a block diagram of another example, non-limiting system 300 that can manage a database of compiled unitaries, and determine whether to compile a unitary and store it in the database, to facilitate enhancing quantum circuit execution in a quantum service, in accordance with various aspects and embodiments of the disclosed subject matter. The system 300 can comprise the quantum computer 102, the compiler component 104, the database component 108 that can store compiled unitaries 110, and the UMC 112, which can manage the use and storage of unitaries (e.g., unitary 106, compiled unitaries 110), in accordance with the defined unitary management criteria, as more fully described herein.

The UMC 112 can receive a job request from a requestor to have the quantum computer 102 perform a job (e.g., quantum computing job), based at least in part on input data received from the requestor with or in connection with the job request and/or from another source that can provide all or a portion of the input data. In some instances, the requestor can provide one or more unitaries, such as unitary 106, with or in connection with the job request. In other instances, an entity associated with the quantum service or a unitary generator component 302 of the system 300 can provide one or more unitaries (e.g., unitary 106) in connection with the job request. For instance, the unitary generator component 302 or UMC 112 can analyze the job request and/or input data, and based at least in part on the results of the analysis of the job request and/or input data, the unitary generator component 302 or UMC 112 can determine a unitary (e.g., unitary 106) that can be desired for use in performing the job responsive to the job request, and the unitary generator component 302 can generate (e.g., automatically generate) the unitary and can present the unitary to the UMC 112.

To facilitate performing the various operations of the UMC 112, the UMC 112 can comprise a communicator component 304 that can communicate with other components or devices (e.g., quantum computer 102, compiler component 104, database component 108, unitary generator component 302, or communication device, . . . ) that can be associated with (e.g., communicatively connected to) the UMC 112. For example, the communicator component 304 can receive a job request and/or input data relating thereto from a communication device (e.g., computer, mobile or cellular phone, or electronic pad or tablet, . . . ) of a requestor. As another example, the communicator component 304 can transmit instructions to the quantum computer 102 relating to executing the job request, or can transmit instructions or a query to retrieve a compiled unitary 110 from the database component 108.

The UMC 112 also can include an operations manager component 306 that can control (e.g., manage) operations associated with the UMC 112. For example, the operations manager component 306 can facilitate generating instructions to have components of the UMC 112 perform operations, and can communicate instructions to components (e.g., communicator component 304, tracker component 308, . . . , processor component 322, data store 324, . . . ) of the UMC 112 to facilitate performance of operations by the components of the UMC 112 based at least in part on the instructions, in accordance with the defined unitary management criteria, defined unitary management algorithms (e.g., unitary management algorithms as disclosed, defined, recited, embodied or indicated herein by the methods, systems, and techniques described herein). The operations manager component 306 also can facilitate controlling data flow between the components of the UMC 112 and controlling data flow between the UMC 112 and another component(s) or device(s) (e.g., quantum computer 102, compiler component 104, database component 108, unitary generator component 302, or communication device, . . . ) associated with (e.g., connected to) the UMC 112.

The UMC 112 can comprise a tracker component 308 that can monitor and track characteristics associated with unitaries (e.g., unitary 106, compiled unitaries 110). For instance, the tracker component 308 can monitor and track a frequency of usage of a quantum function or quantum computation, or an equivalent quantum function or quantum computation, associated with a unitary, an age of the quantum function or computation associated with a unitary, a level of difficulty in compiling a unitary, a quality of the quantum circuit associated with a unitary, a quality of experiment associated with a unitary, a frequency score of a unitary, an age score of a unitary, a compiling difficulty score of a unitary, a circuit quality score of a unitary, an experimental quality score of a unitary, composite quality scores of unitaries, and/or other characteristics associated with unitaries.

The UMC 112 can comprise an evaluator component 310 that can analyze and evaluate unitaries (e.g., uncompiled unitaries, such as unitary 306; or compiled unitaries 310 stored in the database component 108) to facilitate determining whether to compile and use a unitary 106 for a particular job, and store the unitary 106, after being compiled, in the database component 108, or whether to use a stored compiled unitary 110 in the database component 108 in place of the unitary 106 during execution of the job by the quantum computer 102, in accordance with the defined unitary management criteria. For instance, the evaluator component 310 can evaluate respective composite quality scores of the unitary 106 and a compiled unitary 110, and/or an applicable defined threshold composite quality score(s) (which can be based at least in part on the composite quality score of the compiled unitary 110). Based at least in part on the results of such evaluating, the evaluator component 310 can determine whether to compile and use the unitary 106 for the job, store the unitary 106, after being compiled, in the database component 108, and/or remove the stored compiled unitary 110 from the database component 108; or whether to use the stored compiled unitary 110 in place of the unitary 106 during execution of the job by the quantum computer 102, and discard the unitary 106 without compiling the unitary 106, as more fully described herein.

The UMC 112 also can include a score component 312 that can determine and generate various scores relating to unitaries, such as unitary 106 and compiled unitaries 110, based at least in part on the results of analyzing such unitaries. The UMC 112, including the score component 312, can perform the scoring (e.g., determining quality scores and composite quality scores) of unitaries (e.g., unitary 106 or compiled unitaries 110) and updating of the database component 108 with regard to storing compiled unitaries 110 or ranking the quality of compiled unitaries 110 on a continuous or substantially continuous basis, and/or in real time or substantially real time, as desired. Such scoring and updating associated with unitaries can depend in part on the actual runs involving unitaries (e.g., execution of jobs by the quantum computer 102, utilizing the compiled unitaries 110 or a newly submitted unitary 106). In accordance with various embodiments, with regard to a unitary (e.g., unitary 106 or compiled unitary 110), the score component 312 can determine (e.g., calculate) a frequency score, an age score, a compiling difficulty score, a circuit quality score, an experimental quality score, and/or a composite quality score for the unitary and associated quantum function or computation (e.g., quantum matrix), based at least in part on the results of analyzing the various factors of the group of factors (e.g., frequency, age, compiling difficulty, quality of the quantum circuit, and/or quality of experiment) with regard to the unitary.

In some embodiments, the score component 312 can determine a frequency score of a unitary (e.g., unitary 106, or compiled unitary 110) based at least in part on the results of analyzing the unitary associated with a quantum function or computation, including the characteristics of or associated with the unitary. For instance, the score component 312 can analyze historical information regarding executions of quantum programs comprising unitaries. Based at least in part on the results of analyzing the historical information, the score component 312 can determine the frequency of the quantum function or computation associated with the unitary or an equivalent quantum function or computation associated with other unitaries (e.g., equivalent unitaries). An equivalent quantum function or computation can be one that has a same or substantially the same quantum matrix as the quantum matrix associated with the quantum function or computation associated with the unitary under consideration. The score component 312 can determine the frequency score of the unitary (e.g., unitary 106, or compiled unitary 110) based at least in part on how frequently the quantum function or computation associated with the unitary, or an equivalent quantum function or computation associated with other unitaries, have been utilized and/or requested in previous executions of quantum programs (e.g., for all of the history of the quantum function or computation, or an equivalent quantum function or computation; or over a defined period of time). The more frequent the quantum function or computation associated with the unitary or an equivalent quantum function or computation has been used or requested in executions of quantum programs (e.g., by the quantum computer 102 or another quantum computer of the quantum service), the higher the frequency score can be for the unitary associated with the quantum function or computation, as determined by the score component 312. Conversely, the less frequent the quantum function or computation associated with the unitary or an equivalent quantum function or computation has been used or requested in executions of quantum programs, the lower the frequency score can be for the unitary associated with the quantum function or computation, as determined by the score component 312.

In some embodiments, based at least in part on the results of analyzing the historical information relating to the unitary (e.g., unitary 106, or compiled unitary 110) under consideration, the score component 312 can determine the frequency score of the unitary, in part, by determining (e.g., computing) the unitary evolution corresponding to each quantum function or computation associated with the unitary. In certain embodiments, the UMC 112, or a simulator component associated therewith, can perform simulations on quantum functions or computations, and can determine the unitary evolution corresponding each quantum function or computation associated with a unitary, based at least in part on the results of the simulation.

The score component 312 can determine an age score of the unitary (e.g., unitary 106, or compiled unitary 110) under consideration based at least in part on the results of analyzing the unitary, including the characteristics of or associated with the unitary. For instance, the score component 312 can determine the length of time(s) that has elapsed since the last time, or a number of most recent times, the quantum function or computation associated with the unitary, or an equivalent quantum function or computation associated with an equivalent unitary, was queried for use in, or was used in, an execution(s) of a quantum program(s). The score component 312 can determine the age score of the unitary based at least in part on the length of time(s) that has elapsed since the last time, or the most recent times, the quantum function or computation associated with the unitary, or an equivalent quantum function or computation associated with an equivalent unitary, was queried for use in, or was used in, an execution(s) of a quantum program(s). The score component 312 can determine or assign lower age scores for or to unitaries associated with quantum functions or computations that are less popular (e.g., queried or used in execution of quantum programs a longer length of time ago), and can determine or assign higher age scores for or to unitaries associated with quantum functions or computations that are more popular (e.g., queried or used in execution of quantum programs a relatively shorter length of time ago). With regard to a unitary associated with a quantum function or computation that has not been queried before with regard to execution of a quantum program (and with no equivalent quantum function or computation being identified for the unitary), the score component 312 can determine that the age score for such unitary is a relatively higher number, since that is a new type of unitary. In certain embodiments, such age score for a new type of unitary can be a desired default age score, in accordance with (e.g., as specified by) the defined unitary management criteria.

In some embodiments, as it is determined (e.g., by the UMC 112) that a quantum function or computation is not being utilized over time, the score component 312 can decrease (e.g., periodically or continually decrease) the age score associated with a quantum function or computation (and thus, for a unitary associated therewith) over time down to or towards 0 or a threshold score that can indicate the unitary (e.g., compiled unitary 110) associated with the quantum function or computation is to be removed from the database component 108. The UMC 112 can discard a unitary (e.g., compiled unitary 110) associated with such quantum function or computation, for example, if the UMC 112 determines that the age score of the unitary has decreased to below the applicable defined threshold age score (or applicable defined threshold composite quality score) that indicates when a unitary is to be removed from the database component 108.

The score component 312 also can determine a compiling difficulty score of the unitary (e.g., unitary 106, or compiled unitary 110) based at least in part on the results of analyzing the unitary, including the characteristics of or associated with the unitary. For example, the score component 312 determine (e.g., calculate) the compiling difficulty score of the unitary based at least in part on how long it took to compile the unitary (e.g., compiled unitary 110), with regard to a unitary that was compiled, or based at least in part on how long it is estimated to take to compile the unitary (e.g., uncompiled unitary 106), with regard to a unitary that has not yet been compiled. The more difficult it is, or is estimated to be, to compile a unitary (e.g., the more time and/or more resources, etc., of the compiler component 104 that was utilized to compile compiled unitary 110 or is estimated to be utilized to compile a unitary 106), the higher the compiling difficulty score for the unitary can be, as determined by the score component 312. Conversely, the less difficult it is, or is estimated to be, to compile a unitary (e.g., the less time and/or less resources of the compiler component 104, etc., of the compiler component 104 that was utilized to compile compiled unitary 110 or is estimated to be utilized to compile unitary 106), the lower the compiling difficulty score can be, as determined by the score component 312.

In some embodiments, the score component 312 can determine a circuit quality score of a unitary (e.g., unitary 106, or compiled unitary 110) based at least in part on the results of analyzing the unitary, including the characteristics of or associated with the unitary. The score component 312 can quantify the quality of the quantum circuit associated with the unitary and associated quantum function to facilitate determining the circuit quality score of the unitary. The UMC 112 (e.g., the score component 312 or another component of the UMC 112) can determine and assign a level of quality of the quantum circuit associated with the unitary (e.g., unitary 106, or compiled unitary 110) and associated quantum function, wherein the UMC 112 can mark (e.g., assign a circuit quality tag to) the unitary and associated quantum function to indicate the circuit quality level of the unitary and associated quantum function. The score component 312 can determine the circuit quality score of a unitary (e.g., unitary 106, or compiled unitary 110) and associated quantum function is higher with regard to a quantum circuit, associated with a unitary and associated quantum function, that is determined to be higher quality, and can determine the circuit quality score of a unitary and associated quantum function is relatively lower with regard to a quantum circuit, associated with a unitary and associated quantum function, that is determined to be relatively lower quality. The score component 312 can assign a maximum (e.g., highest) circuit quality score to a unitary and associated quantum function that has a quantum circuit that has been determined to be optimal by the UMC 112.

If a circuit quality score of a unitary (e.g., compiled unitary 110) and associated quantum function stored in the database component 108 is higher than a newly submitted unitary (e.g., unitary 106) associated with a same or equivalent quantum function, the score component 312 can determine that the circuit quality score of the stored unitary (e.g., compiled unitary 110) can be increased from its current score by a certain amount to a new higher circuit quality score. If a newly submitted unitary (e.g., unitary 106) associated with a quantum function is being stored in the database component 108 to replace (or displace in ranking) a stored unitary (e.g., compiled unitary 110), associated with a same or equivalent quantum function, that is being discarded from the database component 108 or at least displaced in ranking of unitaries (e.g., due to the composite quality score of the newly submitted unitary being determined to be higher than the stored unitary), the score component 312 can determine that the circuit quality score of the newly submitted unitary (e.g., unitary 106) can be at least as high or higher than the circuit quality score of the stored unitary (e.g., compiled unitary 110) that the newly submitted unitary is replacing (or at least is displacing in the ranking of unitaries stored) in database component 108.

The score component 312 also can determine an experimental quality score of the unitary (e.g., unitary 106, or compiled unitary 110) based at least in part on the results of analyzing the unitary, including the characteristics of or associated with the unitary. In certain embodiments, a simulator component of or associated with the UMC 112 can determine an ideal distribution for a unitary (e.g., unitary 106, or compiled unitary 110) and associated quantum function based at least in part on a simulation of the unitary and associated quantum function. The tracker component 308 can track the actual distribution of a unitary and associated quantum function for each execution of such unitary, and the UMC 112 can determine an amount of error in the distribution for the unitary as compared to the ideal distribution of the unitary determined from simulation of the unitary. The lower the amount of error between actual distribution and the ideal (e.g., simulated) distribution for a unitary and associated quantum function, the higher the experimental quality score for the unitary can be, as determined by the score component 312. Conversely, the higher the amount of error between actual distribution and the ideal distribution for a unitary and associated quantum function, the lower the experimental quality score for the unitary can be, as determined by the score component 312. With regard to a newly submitted unitary and associated quantum function, where there is no actual distribution for the unitary and quantum function (e.g., no actual distribution for execution of the quantum circuit or equivalent quantum circuit that can be applicable or relevant to the newly submitted unitary), the score component 312 can estimate an experimental quality score for the unitary or can assign a default experimental quality score for the unitary, in accordance with (e.g., as specified by) the defined unitary management criteria.

The UMC 112 also can comprise a weight component 314 that can determine respective weights (e.g., weight values) that can be assigned to the respective quality scores determined for the unitary (e.g., unitary 106, or compiled unitary 110), in accordance with the defined unitary management criteria. For instance, in accordance with the defined unitary management criteria, the weight component 314 can determine that a first factor (e.g., frequency factor), which is determined to be more significant, relevant, or important in determining the overall quality of a unitary, can have a higher weight than the weight of a second factor (e.g., circuit quality factor) that is determined to be relatively less significant, relevant, or important in determining the overall quality of the unitary than the first factor. Accordingly, the weight component 314 can assign a higher weight to the first factor and a relatively lower weight to the second factor. In some embodiments, the weight (e.g., weight value) assigned to a factor can range from 1.00 to a value that can be greater than 1.00 (e.g., 1.10, 1.25, 1.50, 2.00, or other desired number greater than 1.00), for example, with regard to a factor that is higher weighted, and can range from 0.99 to a desired number that is less than 0.99 (e.g., 0.90, 0.80, 0.75, 0.50, or other desired number that is less than 0.99), for example, with regard to a factor that is relatively lower weighted.

The weight component 314 can apply the respective weights to the respective quality scores of the unitary (e.g., unitary 106, or compiled unitary 110). Based at least in part on the applying of the respective weights to the respective quality scores of the unitary, the weight component 314 (or score component 312) can determine and generate a weighted frequency score, a weighted age score, a weighted compiling difficulty score, a weighted circuit quality score, and/or a weighted experimental quality score of the unitary. In certain embodiments, the weight component 314 (or score component 312) can determine a weighted score for a factor as a function of the weight and the score of the factor (e.g., as the score of the factor multiplied by the weight applied to the factor).

The score component 312 can determine (e.g., calculate) the composite quality score of the unitary (e.g., unitary 106, or compiled unitary 110) based at least in part on (e.g., as a function of) the weighted frequency score, the weighted age score, the weighted compiling difficulty score, the weighted circuit quality score, and/or the weighted experimental quality score of the unitary. For example, the score component 312 can combine (e.g., add or sum) the respective weighted quality scores (e.g., of the respective factors) of the unitary together to determine the composite quality score of the unitary (e.g., unitary 106, or compiled unitary 110); can determine an average or median value of the respective weighted quality scores of the unitary and use that average or median value as the composite quality score of the unitary; or can utilize (e.g., apply) another desired function (e.g., mathematical function) to the respective weighted quality scores of the unitary to determine the composite quality score of the unitary, in accordance with (e.g., as specified by) the defined unitary management criteria.

In accordance with various embodiments, the UMC 112 can employ a threshold component 316 that can determine and apply, or facilitate applying, one or more various threshold values to enable the UMC 112 (e.g., evaluator component 310 of the UMC 112) to determine whether a unitary (e.g., unitary 106) is to be compiled and utilized for a job and/or stored in the database component 108, and/or to determine whether a stored compiled unitary 110 is to be removed from the database component 108 (e.g., due to age and lack of popularity of the stored compiled unitary 110; or due to a newly submitted unitary 106 having a higher composite quality score than the stored compiled unitary 110). The threshold component 316 can determine or set the one or more various threshold values in accordance with (e.g., as specified by) the defined unitary management criteria. As more fully described herein, the UMC 112 can utilize (e.g., apply) the one or more various threshold values (e.g., defined threshold composite quality score; defined threshold amount between (e.g., difference between) respective composite quality scores of respective unitaries; defined threshold number of unitaries stored in the database component 108; or defined threshold amount of available storage space in the database component 108) as such threshold values are determined to be applicable or relevant by the UMC 112.

The UMC 112 also can comprise a discard component 318 that can discard (e.g., remove, erase, or delete) a compiled unitary 110 from the database component 108, for example, when doing so is in accordance with the defined unitary management criteria. For instance, if a certain compiled unitary 110 is determined to have a lowest composite quality score relative to other composite quality scores of other compiled unitaries in the database component 108 (e.g., due to the age factor or score of the certain compiled unitary 110 or due to another reason that indicates the certain compiled unitary 110 is of poor quality), the evaluator component 310 can determine that the certain compiled unitary 110 is to be removed from the database component 108. In such case, the discard component 318 can remove or discard the certain compiled unitary 110 from the database component 108.

In certain embodiments, if the evaluator component 310 determines that a certain compiled unitary 110 has a composite quality score that is below a defined threshold (e.g., a minimum threshold) composite quality score, the evaluator component 310 can determine that such certain compiled unitary 110 is to be removed from the database component 108. In response, the discard component 318 can remove such certain compiled unitary 110 from the database component 108.

As still another example, when a newly submitted unitary, such as unitary 106 associated with a quantum function, is determined to have a higher composite quality score than the composite quality score of a certain stored compiled unitary 110 associated with the quantum function, and the newly submitted unitary 106 is to be compiled and stored in the database component 108, the evaluator component 310 can determine whether to retain the stored compiled unitary 110, along with the newly compiled and stored (or soon to be stored) unitary 106, in the database component 108. In some embodiments, the evaluator component 310 can determine whether the composite quality score of the certain stored compiled unitary 110 is within a defined threshold amount of the higher composite quality score of the newly compiled and stored unitary 106. If it is not within the defined threshold amount of the higher composite quality score of the unitary 106, the evaluator component 310 can determine that the certain stored compiled unitary 110 has relatively poor quality and is not worth retaining in the database component 108. Accordingly, the evaluator component 310 (or another component, such as operations manager component 306, of the UMC 112) can instruct the discard component 318 to remove the certain compiled unitary 110 from the database component 108, and, in response, the discard component 318 can remove or discard the certain compiled unitary 110 from the database component 108.

If, instead, it is determined that the composite quality score of the certain stored compiled unitary 110 is within the defined threshold amount of the higher composite quality score of the unitary 106, the evaluator component 310 can determine that the certain stored compiled unitary 110 has relatively good quality (even if it is not as good of quality as the newly compiled unitary 106) and may be worth retaining in the database component 108, if there is sufficient storage space available in the database component 108 to retain both the newly compiled unitary 106 and the certain stored compiled unitary 110. In such instance, if the evaluator component 310 determines that there is sufficient storage space in the database component 108 to retain both unitaries, the evaluator component 310 can determine that both unitaries can be retained, and the certain stored compiled unitary 110 will not be removed from the database component 108. If, instead, the evaluator component 310 determines that there is not sufficient space to retain all of the newly compiled unitary 106, the certain stored compiled unitary 110, and the other stored compiled unitaries 110 in the database component 108, the evaluator component 310 can analyze the composite quality scores of the compiled unitaries 110 in the database component 108 to determine whether there is another compiled unitary 110 stored in the database component 108 that has a lower (e.g., lowest) composite quality score than the composite quality score of the certain compiled unitary 110. If the evaluator component 310 determines that there is another compiled unitary 110 that has a lower (e.g., lowest) composite quality score than the composite quality score of the certain compiled unitary 110, the evaluator component 310 can determine that the other compiled unitary 110 having the lower (e.g., lowest) composite quality score is to be removed from the database component 108, and the UMC 112, employing the discard component 318, can remove or facilitate removing the other compiled unitary 110 from the database component 108. That is, the discard component 318 can remove the other compiled unitary 110, which has the lowest composite quality score as compared to all of the stored compiled unitaries 110, from the database component 108. If, rather, the certain compiled unitary 110 is determined to have the lowest composite quality score as compared to all of the stored compiled unitaries 110, the discard component 318 can remove the certain compiled unitary 110 from the database component 108.

In some embodiments, the threshold component 316 can apply or facilitate applying a defined threshold (e.g., maximum threshold) number of unitaries stored in the database component 108, wherein the evaluator component 310 can determine whether to remove a certain compiled unitary 110 (e.g., having a lower or lowest composite quality score) from the database component 108 based at least in part on a determination whether the number of compiled unitaries 110 stored in the database component 108 will exceed the defined threshold number of unitaries if the certain compiled unitary 110 is retained in the database component 108 (e.g., after storing a newly compiled unitary in the database component 108). If the evaluator component 310 determines that the number of compiled unitaries 110 stored in the database component 108 will exceed the defined threshold number of unitaries if the certain compiled unitary 110 is retained in the database component 108, the evaluator component 310 can determine that the certain compiled unitary 110 is to be removed from the database component 108, and the discard component 318 can remove the certain compiled unitary 110 from the database component 108.

In other embodiments, additionally or alternatively, the threshold component 316 can apply or facilitate applying a defined threshold amount of available storage space in the database component 108 in the database component 108, wherein the evaluator component 310 can determine whether to remove a certain compiled unitary 110 (e.g., having a lower or lowest composite quality score) from the database component 108 based at least in part on a determination whether the amount of available storage space in the database component 108 will be less than the threshold amount of available storage space if the certain compiled unitary 110 is retained in the database component 108 (e.g., after storing a newly compiled unitary in the database component 108). If the evaluator component 310 determines that the amount of available storage space in the database component 108 will be less than the threshold amount of available storage space if the certain compiled unitary 110 is retained in the database component 108, the evaluator component 310 can determine that the certain compiled unitary 110 is to be removed from the database component 108, and the discard component 318 can remove the certain compiled unitary 110 from the database component 108.

In certain embodiments, the UMC 112 can enhance desirable (e.g., favorable, suitable, and/or popular) compiled unitaries 110 associated with quantum functions, such as compiled unitaries 110 that have higher or highest composite quality score, by managing the recompiling of such compiled unitaries 110 in background, to further improve such desirable compiled unitaries 110 to make them better performing and/or more efficient. For instance, the UMC 112 can manage the compiler component 104 to have the compiler component 104 recompile such compiled unitaries 110 in background while the quantum service, including the system 300, is online or offline. For example, even while running one or more jobs, the UMC 112, compiler component 104, and/or other components of the system 300 can utilize other resources that remain available (e.g., resources not being used for the one or more jobs) to enable the compiler component 104 to recompile a desired compiled unitary 110; and, if no job is being run, the UMC 112, compiler component 104, and/or other components of the system 300 can utilize desired resources to enable the compiler component 104 to recompile a desired compiled unitary 110.

In some embodiments, the compiler component 104, UMC 112, and/or other components of the system 300 can utilize elaborate and exhaustive techniques (e.g., unitary optimizing and recompiling techniques), which may take a significant amount of time (e.g., days, weeks, or even months) to recompile and enhance the performance of a compiled unitary 110. During this time while a desired compiled unitary 110 associated with a quantum function is being recompiled, it can be unavailable for use. In accordance with various embodiments, the UMC 112 can manage the compiled unitaries 110 to have one or more other compiled unitaries 110 associated with (e.g., that can perform) the quantum function available in the database component 108 for use in jobs in which such quantum function can be desired, wherein such one or more other compiled unitaries 110 can be a version of the compiled unitary 110 that is being recompiled and/or can have desirable (e.g., relatively high) composite quality scores. For example, the version of the compiled unitary 110 can be a copy of the compiled unitary 110 as it existed at the time the recompiling process was being initiated, or it can be a subsequent version of the compiled unitary 110 that can result from partial performance of the recompiling process (e.g., elaborate and exhaustive recompiling process) and partial enhancement of the compiled unitary 110, wherein the subsequent version of the compiled unitary 110 can be somewhat improved in quality (and composite quality score) over the copy of the compiled unitary 110, but not as improved as final or fully recompiled version of the compiled unitary 110 can be, or can be expected to be, after the recompiling process is completed.

In certain embodiments, the UMC 112 can manage the unitaries (e.g., unitary 106, compiled unitaries 110) and the database component 108 to retain respective compiled unitaries 110 associated with a quantum function that respectively perform differently and/or better on different quantum computer systems (e.g., quantum computer 102). For example, the system 300 can comprise a quantum computing system that can comprise multiple quantum computers, including quantum computer 102. In some instances, a first compiled unitary 110 associated with the quantum function and having first quantum circuitry can perform better on a particular quantum computer 102 than a second compiled unitary 110 associated with the quantum function and having second quantum circuitry, whereas the second compiled unitary 110 can perform better on another quantum computer (e.g., an older legacy or otherwise different quantum computer) than the first compiled unitary 110 does. In such cases, the UMC 112 can manage the compiled unitaries 110 and the database component 104 to retain both the first compiled unitary 110 and second compiled unitary 110 in the database component 108. In some embodiments, the score component 312 can determine respective composite quality scores (e.g., a first composite quality score and a third composite quality score) for the first compiled unitary 110 with regard to the respective quantum computers (e.g., quantum computer 102 and the other quantum computer), and can determine respective composite quality scores (e.g., a second composite quality score and a fourth composite quality score) for the second compiled unitary 110 with regard to the respective quantum computers. The first composite quality score of the first compiled unitary 110 can be higher than the third composite quality score due to the first compiled unitary 110 performing better when utilized by the quantum computer 102 than when utilized by the other quantum computer. In a similar manner, the fourth composite quality score of the second compiled unitary 110 can be higher than the second composite quality score due to the second compiled unitary 110 performing better when utilized by the other quantum computer than when utilized by the quantum computer 102.

In accordance with various embodiments, the UMC 112 further can comprise a processor component 320 that can work in conjunction with the other components (e.g., communicator component 304, operations manager component 306, . . . , or data store 322, . . . ) to facilitate performing the various functions of the UMC 112. The processor component 320 can employ one or more processors, microprocessors or controllers that can process data, such as information relating to unitaries, quality scores, composite quality scores, unitary factors or characteristics (e.g., frequency of use of unitaries, age of unitaries, difficulty in compiling unitaries, circuit quality of unitaries, or quality of experiment of unitaries), threshold values, job requests, jobs (e.g., quantum jobs), input data relating to job requests, output data (e.g., quantum or job results) associated with executed jobs, resources, applications, defined unitary management criteria, defined unitary management algorithms, traffic flows, policies, protocols, interfaces, tools or other information, to facilitate operation of the UMC 112, as more fully disclosed herein, and control data flow between the UMC 112 and other components (e.g., database component 108, computer, quantum computer 102, simulator component, or communication device) associated with (e.g., connected to) the UMC 112.

The data store 322 can store data structures (e.g., user data, metadata), code structure(s) (e.g., modules, objects, hashes, classes, procedures) or instructions, information relating to unitaries, quality scores, composite quality scores, unitary factors or characteristics (e.g., frequency of use of unitaries, age of unitaries, difficulty in compiling unitaries, circuit quality of unitaries, or quality of experiment of unitaries), threshold values, job requests, jobs (e.g., quantum jobs), input data relating to job requests, output data (e.g., quantum or job results) associated with executed jobs, resources, applications, defined unitary management criteria, defined unitary management algorithms, traffic flows, policies, protocols, interfaces, tools or other information, to facilitate controlling operations associated with the UMC 112. In an aspect, the processor component 320 can be functionally coupled (e.g., through a memory bus) to the data store 324 in order to store and retrieve information desired to operate or confer functionality, at least in part, to the communicator component 304, operations manager component 306, tracker component 308, . . . , or data store 324, etc. or substantially any other operational aspects of the UMC 112.

Figure 4:
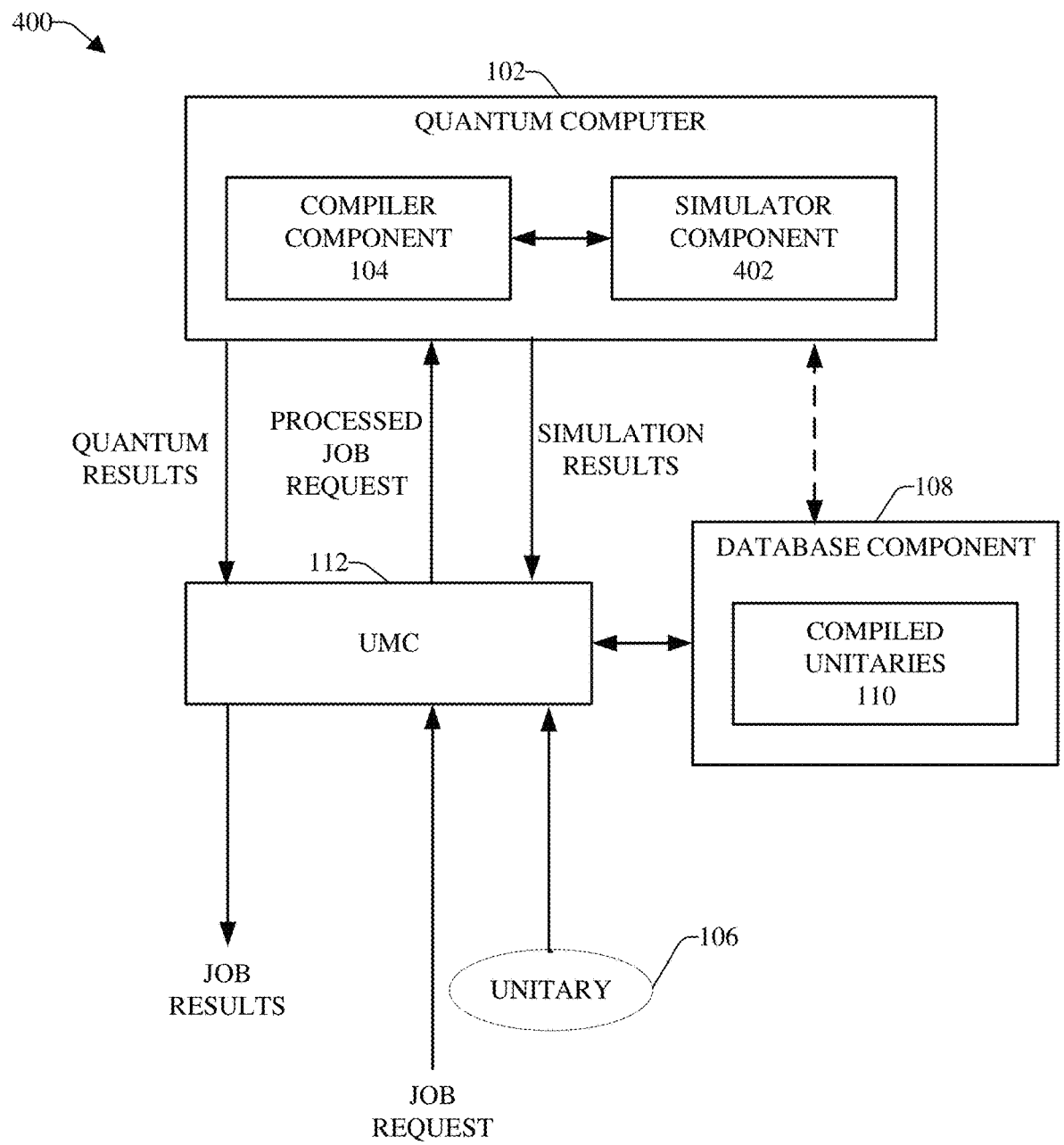
FIG. 4 presents a block diagram of an example, non-limiting system that can employ simulation of unitaries and associated quantum functions to facilitate determining composite quality scores of unitaries and managing the use, compiling, and storage of unitaries, to facilitate enhancing quantum circuit execution in a quantum service, in accordance with various aspects and embodiments of the disclosed subject matter.

FIG. 4 presents a block diagram of an example, non-limiting system 400 that can employ simulation of unitaries and associated quantum functions to facilitate determining composite quality scores of unitaries and managing the use, compiling, and storage of unitaries, to facilitate enhancing quantum circuit execution in a quantum service, in accordance with various aspects and embodiments of the disclosed subject matter. The system 400 can comprise the quantum computer 102, the compiler component 104, the database component 108 that can store compiled unitaries 110, and the UMC 112, which can manage the use and storage of unitaries (e.g., unitary 106, compiled unitaries 110), in accordance with the defined unitary management criteria, as more fully described herein.

In some embodiments, the quantum computer 102 can comprise or be associated with a simulator component 402 that can perform simulations on quantum programs, including unitaries (e.g., unitary 106, and/or compiled unitaries 110), and/or individual unitaries, based at least in part on information in the quantum programs or unitaries, and/or input data relating to the quantum programs or unitaries. For instance, the simulator component 402 can analyze or utilize the historical information relating to a unitary (e.g., unitary 106, or compiled unitary 110) and/or information relating to the unitary and associated quantum function, and the simulator component 402 can perform a simulation, based at least in part on such information, to generate simulation results relating to the unitary. The UMC 112 can determine (e.g., compute) the unitary evolution corresponding to each quantum function or computation associated with the unitary based at least in part on the simulation results. The UMC 112 also determine a frequency score of the unitary based at least in part on such unitary evolution corresponding to the quantum function or computation associated with the unitary, wherein such unitary evolution can represent or correspond to the frequency of use of the quantum function of the unitary or an equivalent quantum function that can be equivalent or substantially equivalent to the quantum function.

In certain embodiments, the simulator component 402 perform a simulation on a unitary (e.g., unitary 106, and/or a compiled unitary 110) to determine a simulated distribution relating to performance of the unitary when executed (e.g., executed in simulation), wherein the simulated distribution can be an ideal distribution relating to performance of the unitary when executed. The UMC 112 can obtain information relating to results (e.g., actual distribution) of actual execution of the unitary (e.g., by the quantum computer 102). The UMC 112 can analyze (e.g., compare) the actual distribution to the ideal (e.g., simulated) distribution with regard to the unitary, and, based at least in part on such analysis, the UMC 112 can determine an amount of error between the actual distribution and the ideal distribution. The UMC 112 can determine (e.g., calculate) an experimental quality score for a unitary based at least in part on (e.g., as a function of) the amount of error between the actual distribution and the ideal distribution with regard to the unitary.

Figure 5:
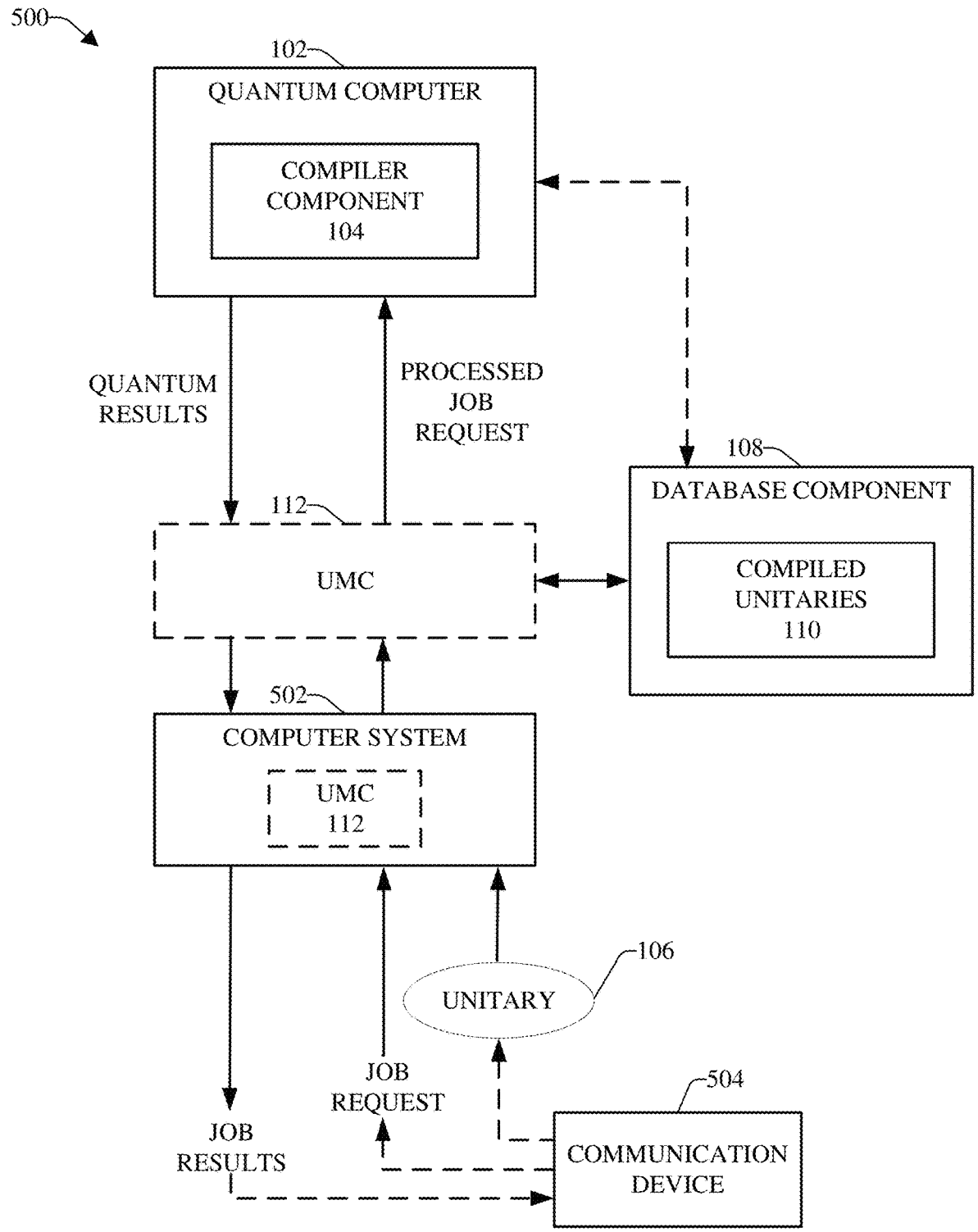
FIG. 5 illustrates a block diagram of an example, non-limiting system 500 that receive and process job requests for quantum jobs, can manage a database of compiled unitaries, and can determine whether to compile a unitary and store it in the database, to facilitate enhancing quantum circuit execution in a quantum service, in accordance with various aspects and embodiments of the disclosed subject matter.

FIG. 5 illustrates a block diagram of an example, non-limiting system 500 that receive and process job requests for quantum jobs, can manage a database of compiled unitaries, and can determine whether to compile a unitary and store it in the database, to facilitate enhancing quantum circuit execution in a quantum service, in accordance with various aspects and embodiments of the disclosed subject matter. The system 500 can comprise the quantum computer 102, the compiler component 104, the database component 108 that can store compiled unitaries 110, and the UMC 112, which can manage the use and storage of unitaries (e.g., unitary 106, compiled unitaries 110), in accordance with the defined unitary management criteria, as more fully described herein.

In some embodiments, the system 500 can comprise a computer system 502 (e.g., classical computer system) that can receive job requests to have jobs (e.g., quantum jobs) performed from users, entities, or other devices, such as communication device 504. The computer system 502 can be a computer (e.g., a desktop computer), a laptop computer, a server, or other type of computer system. In accordance with various embodiments, the computer system 502 can reside in the cloud computing environment, or all or a portion of the computer system 502 can reside in a local environment. In some embodiments, the UMC 112 can be associated with (e.g., communicatively connected to) the computer system 502 (as depicted in FIG. 5) as well as the quantum computer 102. In other embodiments, the UMC 112 can be part of the computer system 502.

In response to receiving a job request, comprising job request information, to have a job performed by the quantum computer 102, the computer system 502 or the UMC 112 can process the job request, and, as desired or appropriate, the computer system 502 or the UMC 112 can modify the information in the job request to translate the information of the job request into a formatted information that can be desirable (e.g., suitable or compatible) for use and execution by the quantum computer 102. The job request information can comprise input data relating to the request, a quantum program, and/or one or more unitaries (e.g., unitary 106). In some instances, the requestor (e.g., user, entity, or communication device 502) submitting the job request can provide a unitary 106 with, or in connection with, the job request. In other instances, a unitary 106 can be received from another source (e.g., an entity associated with the quantum service, or a component or device (e.g., unitary generator component) of or associated with the quantum service), in connection with the job request.

The UMC 112 can submit (e.g., communicate) the processed job request, comprising processed (e.g., formatted) job request information, to the quantum computer 102. In connection with submitting the processed job request to the quantum computer 102, the UMC 112 can retrieve one or more compiled unitaries 110 related to the job request from the database component 108 and can provide the one or more compiled unitaries 110 to the quantum computer 102, or the UMC 112 can instruct the quantum computer to retrieve the one or more compiled unitaries 110 from the database component 108. For instance, if the UMC 112 determines that a compiled unitary 110 associated with a quantum function is to be used in place of an uncompiled unitary 106 associated with the quantum function, the UMC can retrieve the compiled unitary 110 from the database component 108 and can provide the compiled unitary 110 to the quantum computer 102, or the UMC 112 can instruct the quantum computer to retrieve the compiled unitary 110 from the database component 108. If, instead, the UMC 112 determines that the unitary 106 is to be compiled and utilized for the job request, and stored in the database component 108 (e.g., based at least in part on the composite quality score of the unitary 106 relative to the composite quality score(s) of a compiled unitary(ies) 110), the UMC 112 can provide or facilitate providing the unitary 108 to the quantum computer 102 for compiling by the compiler component 104 and use by the quantum computer 102 as part of execution of the job.

The quantum computer 102 can execute the job, based at least in part on the processed job request information, the unitary 106 (if used for the job), and/or the compiled unitary(ies) 110 (if used for the job), to produce quantum results that can be responsive to the job request. The quantum computer 102 can provide the quantum results to the UMC 112 and/or computer system 502. The computer system 502 can provide job results, which can comprise or can be based at least in part on the quantum results, and which can be responsive to the job request, to the requestor (e.g., user, entity, or communication device 504).

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
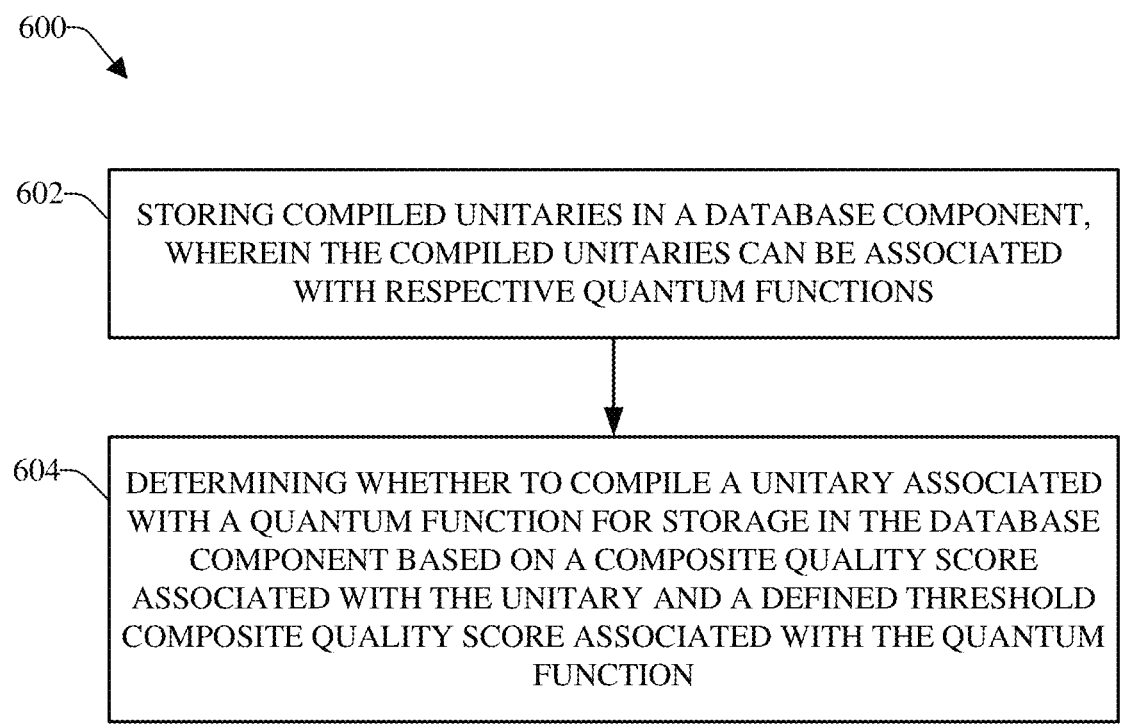
FIG. 6 illustrates a flow diagram of an example, non-limiting method for managing unitaries and a database component comprising compiled unitaries, in accordance with various aspects and embodiments of the disclosed subject matter.

FIG. 6 illustrates a flow diagram of an example, non-limiting method 600 for managing unitaries and a database component comprising compiled unitaries, in accordance with various aspects and embodiments of the disclosed subject matter. The method 600 can be performed by, for example, a system (e.g., computer system) comprising or operatively coupled to a processor component, a memory that can be associated with the processor component, and/or a UMC that can be associated with the processor component and the memory. Repetitive description of like elements employed in other embodiments described herein is or may be omitted for sake of brevity.

At 602, compiled unitaries can be stored in a database component, wherein the compiled unitaries can be associated with respective quantum functions. The database component (e.g., a data store that can comprise a database is structured or unstructured form) can be formed and associated with the UMC. The UMC can manage the database component, including managing storage, retention, and/or maintenance of compiled unitaries in, and/or discarding (e.g., deleting or erasing) of compiled unitaries from, the database component, in accordance with the defined unitary management criteria. Respective compiled unitaries can be associated with (e.g., can be used to perform or facilitate performing) respective quantum functions or computations.

At 604, a determination can be performed regarding whether to compile a unitary associated with a quantum function for storage in the database component based at least in part on a composite quality score associated with the unitary and a defined threshold composite quality score associated with the quantum function. The UMC can determine whether a unitary associated with the quantum function is to be compiled and stored in the database component based at least in part on the composite quality score associated with the unitary and the defined threshold composite quality score associated with the quantum function, in accordance with the defined unitary management criteria.

For instance, in connection with processing a job request, a unitary can be presented to perform a quantum function that can be relevant to the job that is to be performed by the quantum computer. The unitary under consideration can be received by the UMC from the job requestor who requested the job be performed, can be received from an entity associated with the quantum service, or from a unitary generator component that can automatically generate the unitary.

The UMC can analyze the unitary, and, based at least in part on the results of such analysis, the UMC can determine the quantum function or computation associated with the unitary. The UMC can determine (e.g., calculate) a composite quality score for the unitary based at least in part on one or more factors of a group of factors that can include, for example, a frequency of usage of a quantum function or quantum computation, or an equivalent quantum function or quantum computation, associated with the unitary, an age of the quantum function or computation associated with the unitary, a level of difficulty in compiling the unitary, a quality of the quantum circuit associated with the unitary, and/or a quality of experiment associated with the unitary, as more fully described herein.

The UMC can analyze (e.g., evaluate or compare) the composite quality score of the unitary in relation to the defined threshold composite quality score associated with (e.g., applicable to) the quantum function or the database component in general. The defined threshold composite quality score to be applied can be determined by the UMC, as more fully described herein. Based at least in part on the result of analyzing the composite quality score of the unitary in relation to the defined threshold composite quality score, the UMC can determine whether the unitary is to be compiled and stored in the database component, and utilized for the job, or whether the unitary is to be discarded and a compiled unitary associated with the quantum function is to be retrieved from the database component and used for the job in place of the unitary. For example, if the UMC determines that the composite quality score of the unitary satisfies (e.g., exceeds or is greater than) the defined threshold composite quality score, the UMC can determine that the unitary is to be compiled and stored in the database component, and is to be used for the job. If, instead, the UMC determines that the composite quality score of the unitary does not satisfy (e.g., is less than) the defined threshold composite quality score, the UMC can determine that the unitary is not to be compiled and is not to be stored in the database component. In such case, the UMC can discard the unitary, and can retrieve a compiled unitary associated with the quantum function from the database component, wherein the retrieved compiled unitary can be used for the job in place of the discarded unitary.

Figure 7:
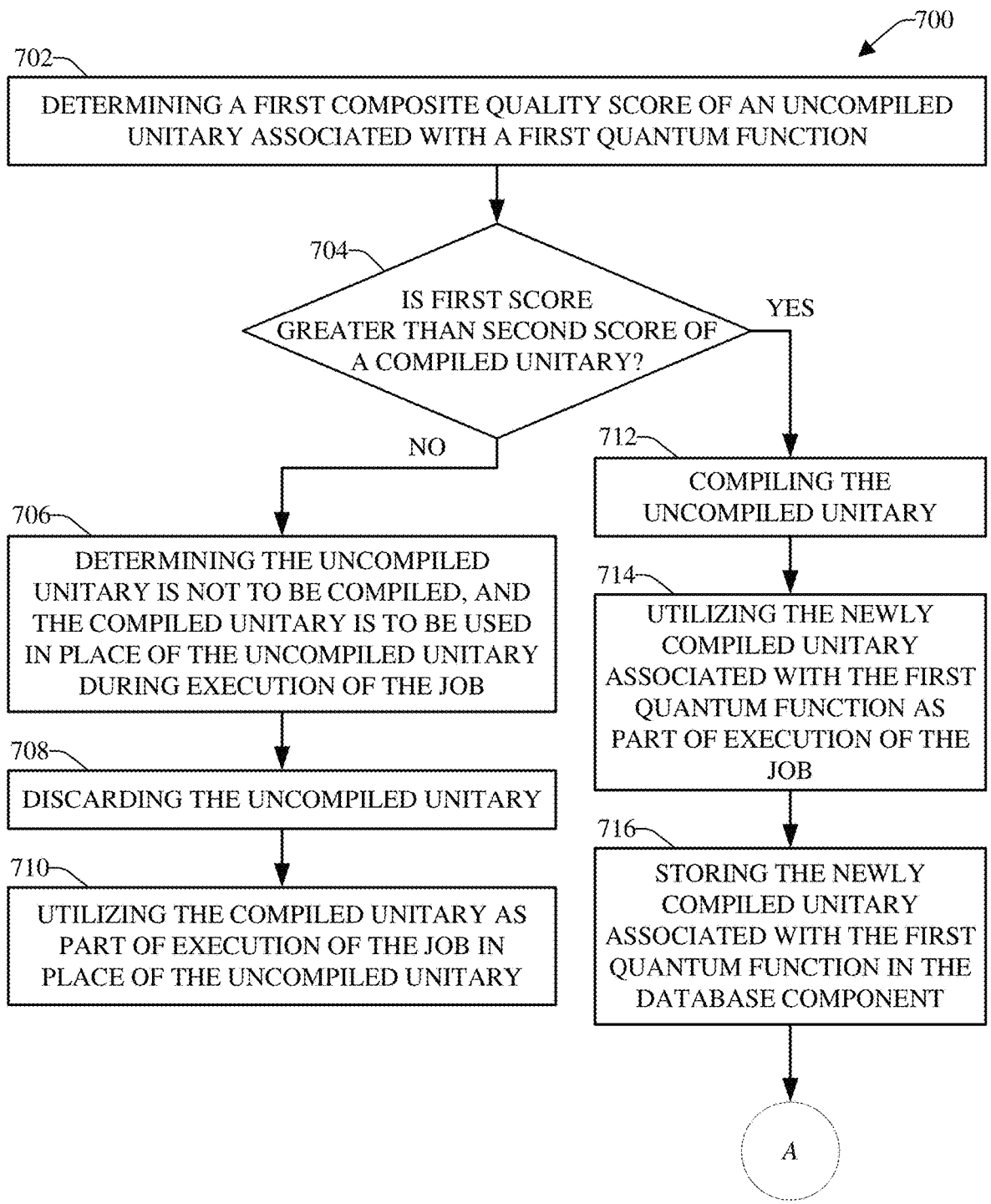
FIGS. 7 and 8 depict a flow diagram of another example, non-limiting method for managing unitaries and a database component comprising compiled unitaries, in accordance with various aspects and embodiments of the disclosed subject matter.
Figure 8:
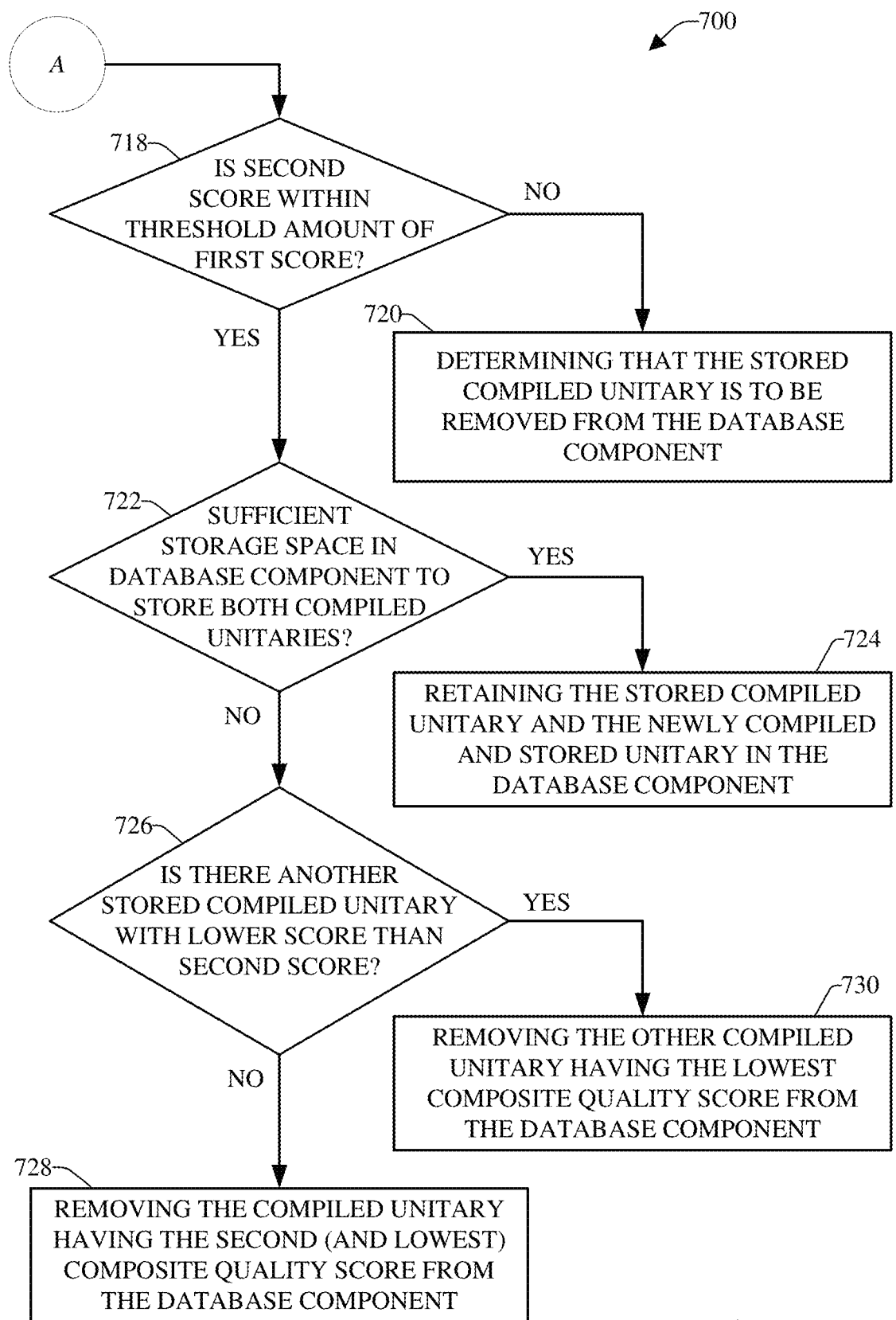

FIGS. 7 and 8 depict a flow diagram of another example, non-limiting method 700 for managing unitaries and a database component comprising compiled unitaries, in accordance with various aspects and embodiments of the disclosed subject matter. The method 700 can be performed by, for example, a system (e.g., computer system) comprising or operatively coupled to a processor component, a memory that can be associated with the processor component, and/or a UMC that can be associated with the processor component and the memory. Repetitive description of like elements employed in other embodiments described herein is or may be omitted for sake of brevity.

At 702, a first composite quality score of an uncompiled unitary associated with a first quantum function can be determined. With regard to an uncompiled unitary being evaluated in connection with a job request for a job to be performed by the quantum computer, the UMC can determine the first composite quality score of an uncompiled unitary associated with the first quantum function based at least in part on evaluating a group of factors (e.g., characteristics or attributes) as such factors relate to the uncompiled unitary. The group of factors can comprise, for example, a frequency of usage of the first quantum function or quantum computation, or an equivalent quantum function or computation, associated with the uncompiled unitary, an age of the first quantum function or computation associated with the uncompiled unitary, a level of difficulty in compiling the uncompiled unitary, a quality of the quantum circuit associated with the uncompiled unitary, and/or a quality of experiment associated with the uncompiled unitary, as more fully described herein.

At 704, a determination can be made regarding whether the first composite quality score of the uncompiled unitary is greater than a second composite quality score of a compiled unitary associated with the first quantum function that is stored in the database component. The UMC can analyze, scan, or query the database component to determine whether there is a compiled unitary associated with the first quantum function that is associated with the uncompiled unitary. In response to identifying the compiled unitary associated with the first quantum function in the database component, the UMC can determine or retrieve the second composite quality score of the compiled unitary, wherein the second composite quality score can be determined based at least in part on an evaluation of the group of factors as such factors relate to the compiled unitary. The UMC can compare the first composite quality score of the uncompiled unitary to the second composite quality score of the compiled unitary. Based at least in part on the results of such comparison, the UMC can determine whether the first composite quality score of the uncompiled unitary is greater than the second composite quality score of the compiled unitary.

If it is determined that the first composite quality score of the uncompiled unitary is not greater than the second composite quality score of the stored compiled unitary, at 706, a determination can be made that the uncompiled unitary is not to be compiled, and the compiled unitary is to be used in place of the uncompiled unitary during execution of the job. For instance, in response to determining that the first composite quality score is not greater than the second composite quality score, the UMC can determine that the uncompiled unitary is not higher quality than the stored compiled unitary, and accordingly, can determine that the uncompiled unitary is not to be compiled, and the compiled unitary is to be used in place of the uncompiled unitary during execution of the job.

At 708, the uncompiled unitary can be discarded. Further in response to determining that the first composite quality score is not greater than the second composite quality score, the UMC can discard or facilitate discarding the uncompiled unitary.

At 710, the compiled unitary can be utilized as part of execution of the job in place of the uncompiled unitary. The UMC can manage the execution of the job (e.g., quantum job) by the quantum computer by instructing the quantum computer to utilize the compiled unitary, in place of the uncompiled unitary, to facilitate having the first quantum function performed during execution of the job by the quantum computer. In response to the instructions, the quantum computer can utilize the compiled unitary, in place of the uncompiled unitary, during execution of the job.

Referring again to reference numeral 704, if, instead, it is determined that the first composite quality score of the uncompiled unitary is greater than the second composite quality score of the compiled unitary, at 712, the uncompiled unitary can be compiled. For instance, in response to determining that the first composite quality score is greater than the second composite quality score, the UMC can determine that the uncompiled unitary is higher quality than the stored compiled unitary, and accordingly, can determine that the uncompiled unitary is to be compiled. The UMC can manage the compiling of the uncompiled unitary by instructing the compiler component to compile the uncompiled unitary. In response to the instructions, the compiler component can compile the uncompiled unitary to generate a newly compiled unitary associated with the first quantum function.

At 714, the newly compiled unitary associated with the first quantum function can be utilized as part of execution of the job. The UMC can manage the execution of the job (e.g., quantum job) to instruct the quantum computer to utilize the newly compiled unitary associated with the first quantum function as part of execution of the job. In response, the quantum computer can utilize the newly compiled unitary during execution of the job.

At 716, the newly compiled unitary associated with the first quantum function can be stored in the database component. Further in response to determining that the first composite quality score is greater than the second composite quality score, the UMC can determine that the newly compiled unitary is to be stored in the database component, and the UMC can store or facilitate storing the newly compiled unitary in the database component.

At this point, the method 700 can proceed to reference point A, wherein, as shown in FIG. 8, the method 700 can proceed from reference point A.

Turning to FIG. 8, and proceeding from reference point A, at 718, a determination can be made regarding whether the second composite quality score of the compiled unitary is within a defined threshold amount of the first quality score of the newly compiled unitary. Based at least in part on the results of analyzing (e.g., comparing) the second composite quality score and the first composite quality score, the UMC can determine whether the second composite quality score of the compiled unitary is within a defined threshold amount of the first composite quality score of the newly compiled unitary to facilitate determining whether the compiled unitary is to be retained in the database component.

If it is determined that the second composite quality score is not within the defined threshold amount of the first composite quality score, at 720, a determination can be made that the stored compiled unitary is to be removed from the database component. If the UMC determines that the second composite quality score of the compiled unitary is not within the defined threshold amount of the first composite quality score of the newly compiled and stored unitary, the UMC can determine that the stored compiled unitary is to be removed (e.g., deleted, erased, or discarded) from the database component. For instance, if the UMC determines that the second composite quality score is not within the defined threshold amount of the first composite quality score, the UMC can determine that the stored compiled unitary has a significantly lower quality than the newly compiled and stored unitary, and because of this, it is not worth using storage space in the database component to store a compiled unitary of significantly lower quality. Accordingly, the UMC can determine that the compiled unitary is to be removed from the database component, and the UMC can remove or facilitate removing the compiled unitary from the database component.

Referring again to reference numeral 718, if, instead, it is determined that the second composite quality score is within the defined threshold amount of the first composite quality score, at 722, a determination can be made regarding whether there is sufficient storage space in the database component to store both the stored compiled unitary and the newly compiled and stored unitary in the database component. For instance, if, instead, the UMC determines that the second composite quality score is within the defined threshold amount of the first composite quality score, the UMC can determine whether there is sufficient storage space in the database component to store both the stored compiled unitary and the newly compiled and stored unitary.

If it is determined that there is sufficient storage space in the database component to store both the stored compiled unitary and the newly compiled and stored unitary in the database component, at 724, the stored compiled unitary and the newly compiled and stored unitary can be retained in the database component. If the UMC determines that there is sufficient storage space in the database component to store both the stored compiled unitary and the newly compiled and stored unitary in the database component, the UMC can determine that both the stored compiled unitary and the newly compiled and stored unitary can be retained in the database component, and the UMC can manage the database component to retain both compiled unitaries associated with the first quantum function in the database component.

Referring again to reference numeral 722, if, instead, it is determined that there is not sufficient storage space in the database component to store both the stored compiled unitary and the newly compiled and stored unitary in the database component, at 726, a determination can be made regarding whether there is another compiled unitary stored in the database component that has a lower composite quality score than the second composite quality score of the compiled unitary. For instance, if the UMC determines that there is not sufficient storage space in the database component to store both the stored compiled unitary and the newly compiled and stored unitary in the database component, the UMC can determine whether there is another compiled unitary stored in the database component that has a lower composite quality score than the second composite quality score of the compiled unitary.

If it is determined that there is no other compiled unitary stored in the database component that has a lower composite quality score than the second composite quality score of the compiled unitary, at 728, the compiled unitary having the second (and lowest) composite quality score can be removed from the database component. For instance, the UMC can compare the second composite quality score of the compiled unitary to other composite quality scores of other stored unitaries associated with other quantum functions (or the same first quantum function). If, based at least in part on the comparison results, the UMC determines that there is no other compiled unitary stored in the database component that has a lower composite quality score than the second composite quality score of the compiled unitary, the UMC can determine that the compiled unitary having the second (and lowest) composite quality score is to be removed from the database component, and the UMC can remove or facilitate removing the compiled unitary from the database component.

Referring again to reference numeral 726, if, instead, it is determined that there is another compiled unitary stored in the database component that has a lower (e.g., lowest)

composite quality score than the second composite quality score of the compiled unitary, at 730, the other compiled unitary having the lowest composite quality score can be removed from the database component. If, based at least in part on the results of comparing the second composite quality score to the other composite quality scores of the other stored compiled unitaries, the UMC determines that there is another compiled unitary stored in the database component that has a lower composite quality score than the second composite quality score of the compiled unitary, the UMC can determine that the other compiled unitary having the lower (e.g., lowest) composite quality score is to be removed from the database component, and the UMC can remove or facilitate removing the other compiled unitary from the database component. That is, the UMC can remove or facilitate removing the other compiled unitary, which has the lowest composite quality score as compared to all of the stored compiled unitaries, from the database component.

Figure 9:
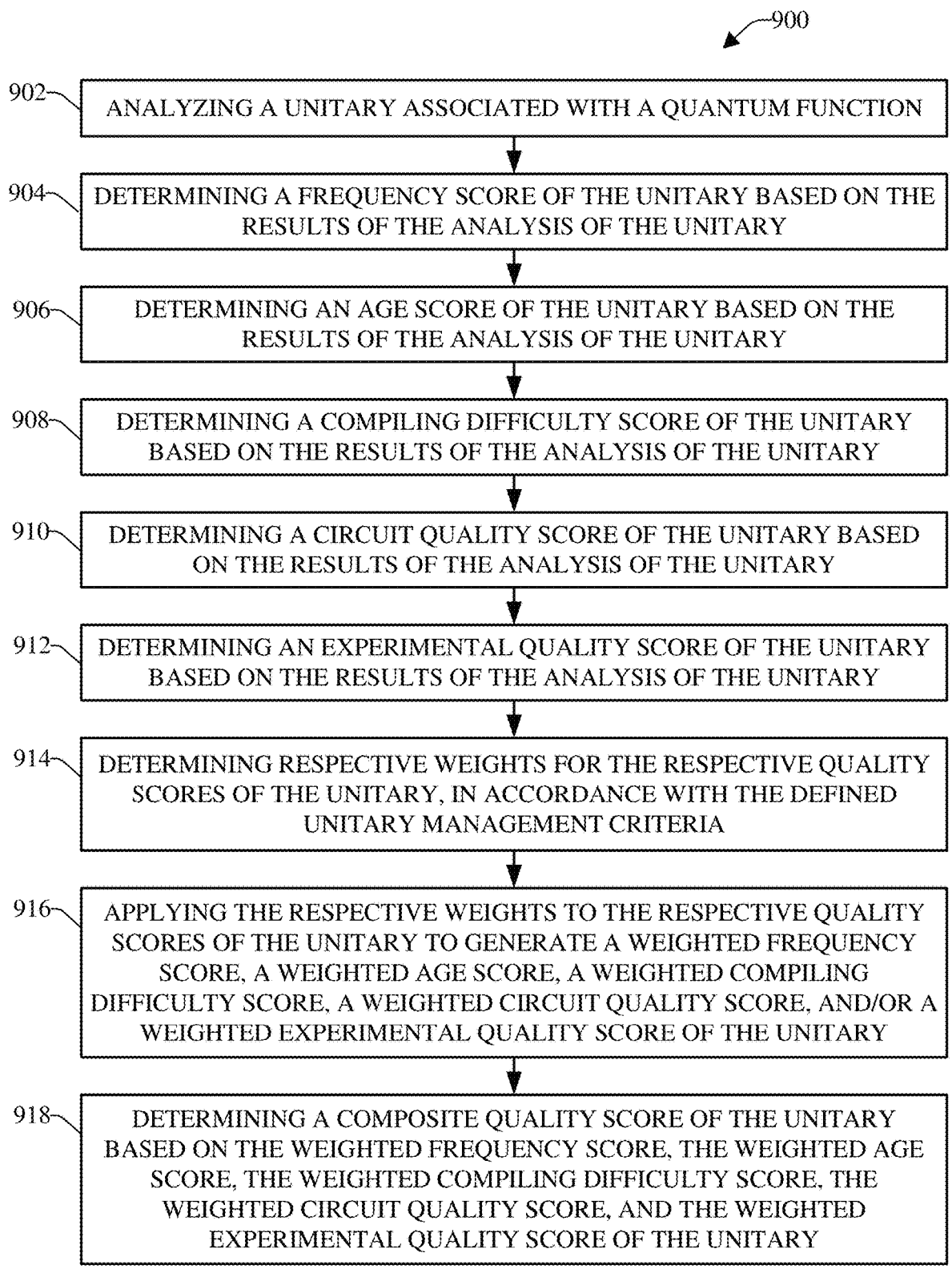
FIG. 9 illustrates a flow diagram of an example, non-limiting method for determining a composite quality score associated with a unitary associated with a quantum function, in accordance with various aspects and embodiments of the disclosed subject matter.

FIG. 9 illustrates a flow diagram of an example, non-limiting method 900 for determining a composite quality score associated with a unitary associated with a quantum function, in accordance with various aspects and embodiments of the disclosed subject matter. The method 900 can be performed by, for example, a system (e.g., computer system) comprising or operatively coupled to a processor component, a memory that can be associated with the processor component, and/or a UMC that can be associated with the processor component and the memory. Repetitive description of like elements employed in other embodiments described herein is or may be omitted for sake of brevity.

At 902, a unitary associated with a quantum function can be analyzed. The UMC can analyze the unitary, including the characteristics (e.g., attributes or features) of or associated with the unitary, which can include characteristics of or associated equivalent unitaries associated with the quantum function.

At 904, a frequency score of the unitary can be determined based at least in part on the results of the analysis of the unitary. The UMC can determine the frequency score of the unitary based at least in part on the results of analyzing the unitary, including the characteristics of or associated with the unitary. For instance, the UMC can analyze historical information regarding executions of quantum programs comprising unitaries, and, based at least in part on the analysis of the historical information, the UMC can determine the frequency of use (or querying for use) of the quantum function or computation associated with the unitary or an equivalent quantum function or computation associated with other unitaries (e.g., equivalent unitaries). The UMC can determine the frequency score of the unitary based at least in part on how frequently the quantum function or computation associated with the unitary, or an equivalent quantum function or computation associated with other unitaries, has been utilized and/or requested in previous executions of quantum programs (e.g., over the entire history; or over a defined period of time), as more fully described herein.

At 906, an age score of the unitary can be determined based at least in part on the results of the analysis of the unitary. The UMC can determine the age score of the unitary based at least in part on the results of analyzing the unitary, including the characteristics of or associated with the unitary. For instance, the UMC can determine the length of time(s) that has elapsed since the last time, or a number of most recent times, the quantum function or computation, or an equivalent quantum function or computation, was queried for use in, or was used in, executions of quantum programs. The UMC can determine the age score of the unitary based at least in part on the length of time(s) that has elapsed since the last time, or the most recent times, the quantum function or computation, or an equivalent quantum function or computation, was queried for use in, or was used in, executions of quantum programs, as more fully described herein.

At 908, a compiling difficulty score of the unitary can be determined based at least in part on the results of the analysis of the unitary. The UMC can determine the compiling difficulty score of the unitary based at least in part on the results of analyzing the unitary, including the characteristics of or associated with the unitary. For example, the UMC determine the compiling difficulty score of the unitary based at least in part on how long it took to compile the unitary, with regard to a unitary that was compiled, or based at least in part on how long it is estimated to take to compile the unitary, with regard to a unitary that has not yet been compiled, as more fully described herein.

At 910, a circuit quality score of the unitary can be determined based at least in part on the results of the analysis of the unitary. The UMC can determine the circuit quality score of the unitary based at least in part on the results of analyzing the unitary, including the characteristics of or associated with the unitary. The UMC can determine and assign a level of quality of the quantum circuit associated with the unitary and associated quantum function, based at least in part on the analysis results. The UMC can determine the circuit quality score (e.g., higher score, or relatively lower score) of the unitary based at least in part on the level (e.g., higher level, or relatively lower level) of quality of the quantum circuit associated with the unitary, as more fully described herein.

At 912, an experimental quality score of the unitary can be determined based at least in part on the results of the analysis of the unitary. The UMC can determine the experimental quality score of the unitary based at least in part on the results of analyzing the unitary, including the characteristics of or associated with the unitary. For instance, the UMC can determine the experimental quality score of the unitary based at least in part on an amount of error between the actual distribution of a unitary and associated quantum function for each execution of such unitary as compared to an ideal distribution of the unitary, as determined from simulation of the unitary by the simulator component, as more fully described herein. A lower amount of error can correspond to a higher experimental quality score, and a higher amount of error can correspond to a relatively lower experimental quality score. With regard to a newly submitted unitary and associated quantum function, where there is no actual distribution for the unitary and quantum function (e.g., no actual distribution for execution of the quantum circuit or equivalent quantum circuit that can be applied to the newly submitted unitary), the UMC can estimate an experimental quality score for the unitary or can assign a default experimental quality score for the unitary, in accordance with (e.g., as specified by) the defined unitary management criteria.

At 914, respective weights can be determined for the respective quality scores of the unitary, in accordance with the defined unitary management criteria. The UMC can determine the respective weights (e.g., weight values) for the respective qualify scores of the unitary, in accordance with the defined unitary management criteria. For instance, in accordance with the defined unitary management criteria, the UMC can determine that a factor (e.g., frequency factor), which is determined to be more significant, relevant, or important in determining the overall quality of a unitary, can have a higher weight than the weight of another factor (e.g., circuit quality factor) that is determined to be relatively less significant, relevant, or important in determining the overall quality of the unitary.

At 916, the respective weights can be applied to the respective quality scores of the unitary to generate a weighted frequency score, a weighted age score, a weighted compiling difficulty score, a weighted circuit quality score, and/or a weighted experimental quality score of the unitary. The UMC can apply the respective weights to the respective quality scores of the unitary to determine and generate the weighted frequency score, the weighted age score, the weighted compiling difficulty score, the weighted circuit quality score, and/or the weighted experimental quality score of the unitary.

At 918, a composite quality score of the unitary can be determined based at least in part on the weighted frequency score, the weighted age score, the weighted compiling difficulty score, the weighted circuit quality score, and the weighted experimental quality score of the unitary. The UMC can determine (e.g., calculate) the composite quality score of the unitary based at least in part on (e.g., as a function of) the weighted frequency score, the weighted age score, the weighted compiling difficulty score, the weighted circuit quality score, and the weighted experimental quality score of the unitary. For example, in accordance with (e.g., as specified by) the defined unitary management criteria, the UMC can combine (e.g., add) the respective weighted quality scores together to determine the composite quality score of the unitary; or alternatively or additionally, the UMC can determine an average or median value of the respective weighted quality scores and use the average or median value as the composite quality score of the unitary; or alternatively or additionally, the UMC can utilize (e.g., apply) another desired function (e.g., mathematical function) to the respective weighted quality scores of the unitary to determine the composite quality score of the unitary.

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 10:
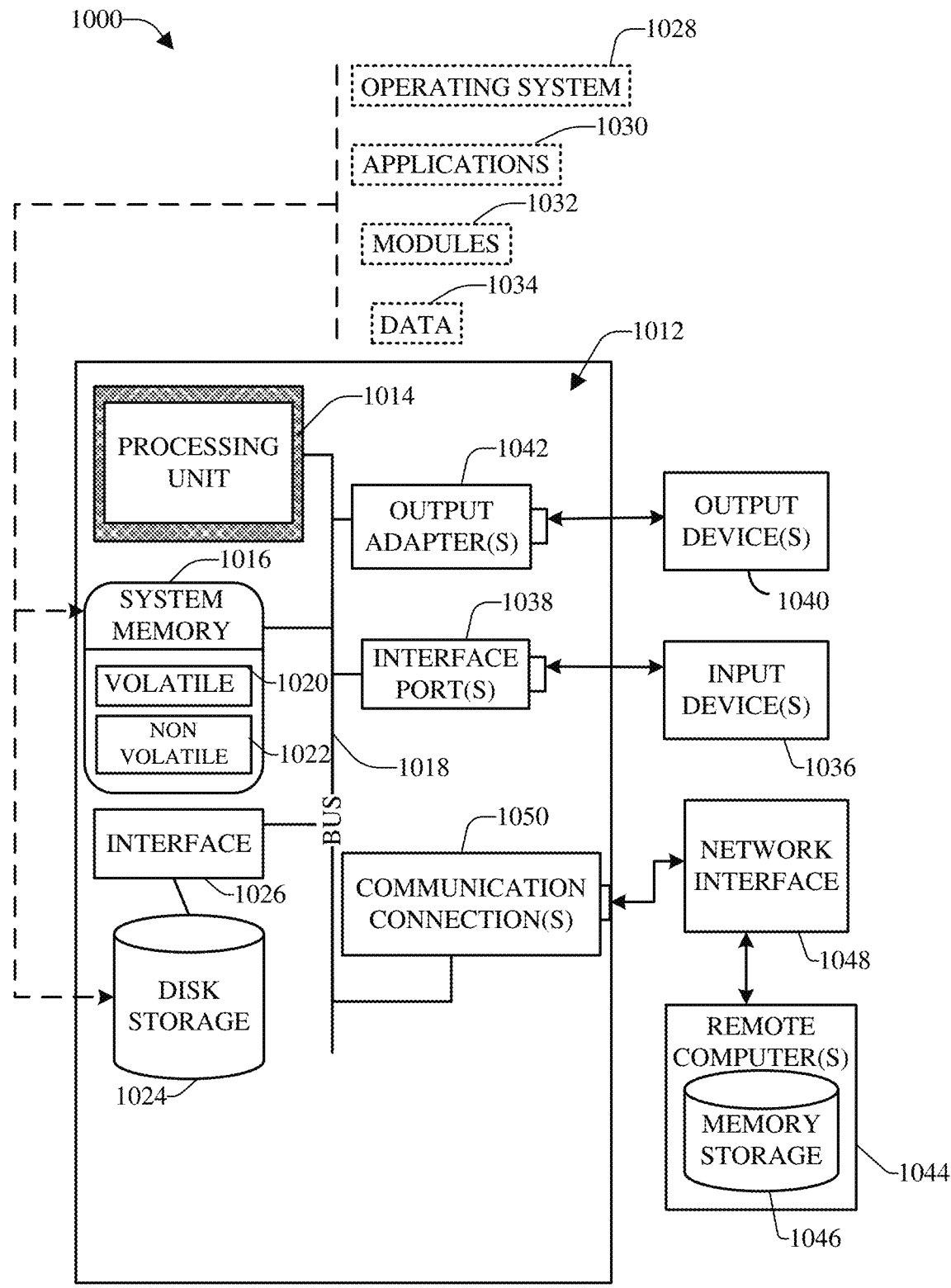
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is or may be omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a method of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

One or more embodiments can be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can include the following: a portable computer diskette, a hard disk, a RAM, a ROM, an erasable programmable read-only memory (EPROM or Flash memory), a SRAM, a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include ROM, PROM, EPROM, EEPROM, flash memory, or nonvolatile RAM (e.g., FeRAM). Volatile memory can include RAM, which can act as external cache memory, for example. By way of illustration and not limitation, RAM is available in many forms such as SRAM, DRAM, SDRAM, DDR SDRAM, ESDRAM, SLDRAM, DRRAM, DRDRAM, and RDRAM. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer-executable components; and
a processor, operatively coupled to the memory, that executes computer-executable components, the computer-executable components comprising:
a unitary management component that:
receives a request to perform a quantum computing job, wherein the request comprises a first unitary capable of performing a quantum function associated with the quantum computing job;
identifies a second compiled unitary stored in a database component, wherein the second compiled unitary is capable of performing the quantum function associated with the quantum computing job;
compares a first composite quality score associated with the first unitary a second composite quality score associated with the second compiled unitary;
in response to determining that the first composite quality score satisfies a defined threshold with respect to the second composite quality score:
compiles the first unitary into a first compiled unitary,
executes, using a quantum device, the quantum computing job using the first compiled unitary, and
stores the first compiled unitary in the database component; and
in response to determining that the first composite quality score does not satisfy the defined threshold with respect to the second composite quality score:
executes, using the quantum device, the quantum computing job using the second compiled unitary,
forgoes compiling the first unitary, and
discards the first unitary without storing the first unitary in the database component.

2. The system of claim 1, wherein the unitary is a physical pulse sequence of a quantum program, a physical circuit of the quantum program, a quantum circuit of the quantum program, or a higher level quantum function that is at an abstraction layer level that is higher than the quantum circuit.

3. The system of claim 1, wherein the unitary management component determines the first composite quality score based on a group of factors comprising a frequency of utilization of the quantum function or another quantum function determined to be equivalent to the quantum function, a time of a last query for the quantum function or the other quantum function, an estimated level of difficulty of compiling the first unitary, a quality value associated with an estimated compiled result of compiling the first unitary, or an amount of error associated with a previous experimental execution of the quantum function.

4. The system of claim 1, wherein the database component stores compiled unitaries associated with respective quantum functions, wherein the compiled unitaries comprise the second compiled unitary and the second composite quality score.

5. The system of claim 1, wherein the quantum function is based on a first computation that facilitates performance of the quantum function or based on a second computation that facilitates performance of the quantum function, wherein the first compiled unitary is associated with the first computation, wherein the second compiled unitary is associated with the second computation, and wherein the second computation is substantially equivalent to the first computation.

6. The system of claim 1, wherein the defined threshold is determined based on the second composite quality score.

7. The system of claim 1,
wherein the unitary management component, in response to determining that the first composite quality score satisfies the defined threshold with respect to the second composite quality score, determines whether to remove the second compiled unitary from the database component based on an amount of difference between the second composite quality score and the first composite quality score.

8. The system of claim 1,
wherein the unitary management component determines whether to remove the second compiled unitary from the database component further based on an amount of available storage space in the database component.

9. The system of claim 1, wherein the unitary management component simulates execution of the first unitary and determines the first composite quality score associated with the unitary based on a simulation result of the simulation and a group of factors relating to an estimated usefulness of the first unitary, an estimated level of difficulty in compiling the first unitary, or an estimated experimental quality of the first unitary.

10. A computer-implemented method, comprising:
receiving, by a system operatively coupled to a processor, a request to perform a quantum computing job, wherein the request comprises a first unitary capable of performing a quantum function associated with the quantum computing job;
identifying, by the system, a second compiled unitary stored in a database component, wherein the second compiled unitary is capable of performing the quantum function associated with the quantum computing job;
comparing, by the system, a first composite quality score associated with the first unitary a second composite quality score associated with the second compiled unitary;
in response to determining that the first composite quality score satisfies a defined threshold with respect to the second composite quality score:
compiling, by the system, the first unitary into a first compiled unitary,
executing, by the system, using a quantum device, the quantum computing job using the first compiled unitary, and
storing, by the system, the first compiled unitary in the database component; and
in response to determining that the first composite quality score does not satisfy the defined threshold with respect to the second composite quality score:
executing, by the system, using the quantum device, the quantum computing job using the second compiled unitary,
forgoing, by the system, compiling the first unitary, and
discarding, by the system, the first unitary without storing the first unitary in the database component.

11. The computer-implemented method of claim 10, wherein the unitary is a physical pulse sequence of the quantum program, a physical circuit of the quantum program, a quantum circuit of the quantum program, or a higher level quantum function that is at an abstraction layer level that is higher than the quantum circuit.

12. The computer-implemented method of claim 10, further comprising:
determining, by the system, the first composite quality score based on a set of factors comprising a frequency of utilization of the quantum function or another quantum function determined to be equivalent to the quantum function, an age of a last query for the quantum function or the other quantum function, an estimated level of difficulty of compiling the first unitary, a quality value associated with an estimated compiled result of compiling the first unitary, or an amount of error associated with a quantum circuit execution of the quantum function.

13. The computer-implemented method of claim 10, further comprising:
storing, by the system, compiled unitaries in the database component, wherein the compiled unitaries are associated with respective quantum functions, wherein the compiled unitaries comprise the second compiled unitary and the second a composite quality score.

14. The computer-implemented method of claim 13, further comprising:
in response to determining that the first composite quality score satisfies the defined threshold with respect to the second composite quality score, determining, by the system,
whether to remove the second compiled unitary from the database component based on an amount of difference between the second composite quality score and the first composite quality score.

15. The computer-implemented method of claim 14, wherein the determining whether to remove the second compiled unitary from the database component is further based on an amount of available storage space in the database component.

16. A computer program product that facilitates managing unitaries, the computer program product comprising a computer readable storage medium having program instructions embodied therewith, the program instructions are executable by a processor to cause the processor to:
receive request to perform a quantum computing job, wherein the request comprises a first unitary capable of performing a quantum function associated with the quantum computing job;
identify a second compiled unitary stored in a database component, wherein the second compiled unitary is capable of performing the quantum function associated with the quantum computing job;
compare a first composite quality score associated with the first unitary a second composite quality score associated with the second compiled unitary;
in response to determining that the first composite quality score satisfies a defined threshold with respect to the second composite quality score:
first unitary into a first compiled unitary,
execute, using a quantum device, the quantum computing job using the first compiled unitary, and
store the first compiled unitary in the database component; and
in response to determining that the first composite quality score does not satisfy the defined threshold with respect to the second composite quality score:
execute, using the quantum device, the quantum computing job using the second compiled unitary,
forgo compiling the first unitary, and
discard the first unitary without storing the first unitary in the database component.

17. The computer program product of claim 16, wherein the unitary is a physical pulse sequence of a quantum program, a physical circuit of the quantum program, a quantum circuit of the quantum program, or a higher level quantum function that is at an abstraction layer level that is higher than the quantum circuit.

18. The computer program product of claim 16, wherein the program instructions are executable by the processor to cause the processor to:
- determine the first composite quality score based on a set of factors comprising a frequency of utilization of the quantum function or another quantum function determined to be equivalent to the quantum function, an age of a last query for the quantum function or the other quantum function, an estimated level of difficulty of compiling the first unitary, a quality value associated with an estimated compiled result of compiling the first unitary, or an amount of error associated with a quantum circuit execution of the quantum function.

19. The computer program product of claim 16, wherein the program instructions are executable by the processor to cause the processor to:
- in response to determining that the first composite quality score satisfies the defined threshold with respect to the second composite quality score, determine whether to remove the second compiled unitary from the database component based on an amount of difference between the second composite quality score and the first composite quality score.

20. The computer program product of claim 19, wherein the determination of whether to remove the second compiled unitary from the database component is further based on an amount of available storage space in the database component.

* * * * *